(12) United States Patent
Parsons

(10) Patent No.: US 8,216,113 B2
(45) Date of Patent: Jul. 10, 2012

(54) ENGINE POWERED DEVICE HAVING ACCESSORY DRIVE AND REVERSING MOTOR FOR SELECTIVELY STARTING ENGINE AND POWERING ACCESSORY DRIVE

(75) Inventor: Scott Parsons, Toronto (CA)

(73) Assignee: Litens Automotive Partnership, Woodbridge (CA)

( * ) Notice: Subject to any disclaimer, the term of this patent is extended or adjusted under 35 U.S.C. 154(b) by 580 days.

(21) Appl. No.: 12/470,872

(22) Filed: May 22, 2009

(65) Prior Publication Data

US 2009/0298646 A1 Dec. 3, 2009

Related U.S. Application Data

(60) Provisional application No. 61/056,199, filed on May 27, 2008.

(51) Int. Cl.
*B60K 23/00* (2006.01)

(52) U.S. Cl. ...................................... 477/167; 180/53.8

(58) Field of Classification Search ................. 180/53.8; 477/166, 174, 175, 5; 192/48.4, 48.8, 48.92; 74/810.1
See application file for complete search history.

(56) References Cited

U.S. PATENT DOCUMENTS

| 2,916,024 A * | 12/1959 | Dodge | 474/14 |
| 4,662,861 A * | 5/1987 | Seung et al. | 474/86 |
| 7,727,115 B2 * | 6/2010 | Serkh | 477/115 |

* cited by examiner

*Primary Examiner* — David D Le
*Assistant Examiner* — David J Hlavka
(74) *Attorney, Agent, or Firm* — Harness, Dickey & Pierce, P.L.C.

(57) ABSTRACT

A device having an engine, a motor/generator and an accessory system having an accessory that is driven by rotary power. The device can be operated in a first mode in which the engine provides rotary power for driving the accessory and the motor/generator. The device can be operated in a second mode for starting the engine and driving the accessory in which rotary power is output from the motor/starter in a first rotational direction. The device can also be operated in a third mode in which the motor/generator outputs rotary power in a second, opposite rotational direction for driving the accessory while the engine is not operating. A method for operating the device is also provided.

20 Claims, 14 Drawing Sheets

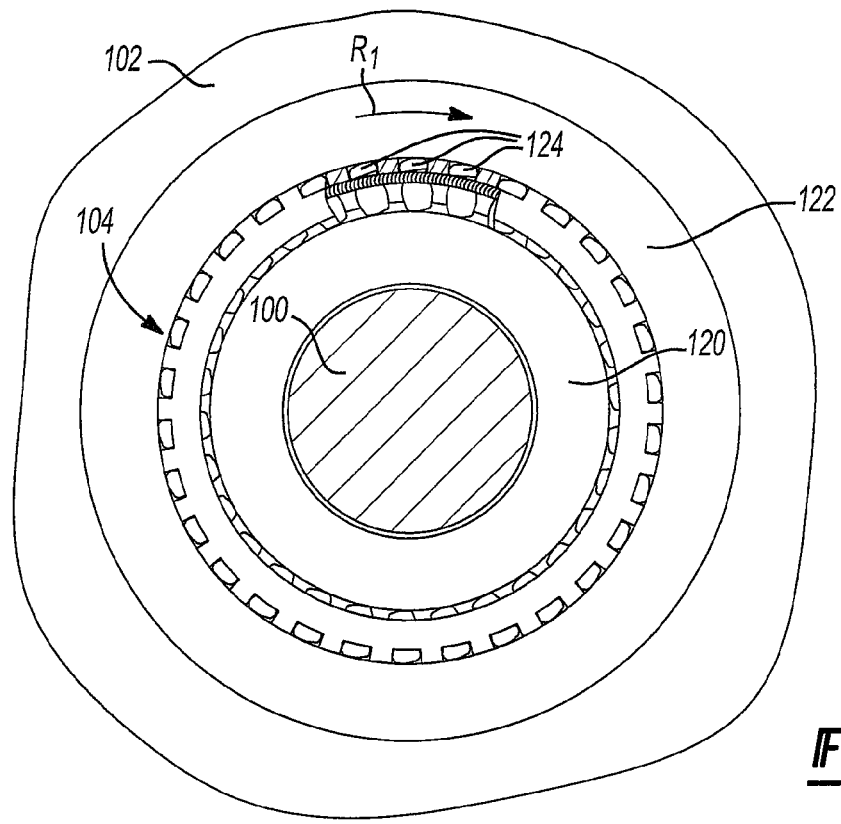
*Fig-6*
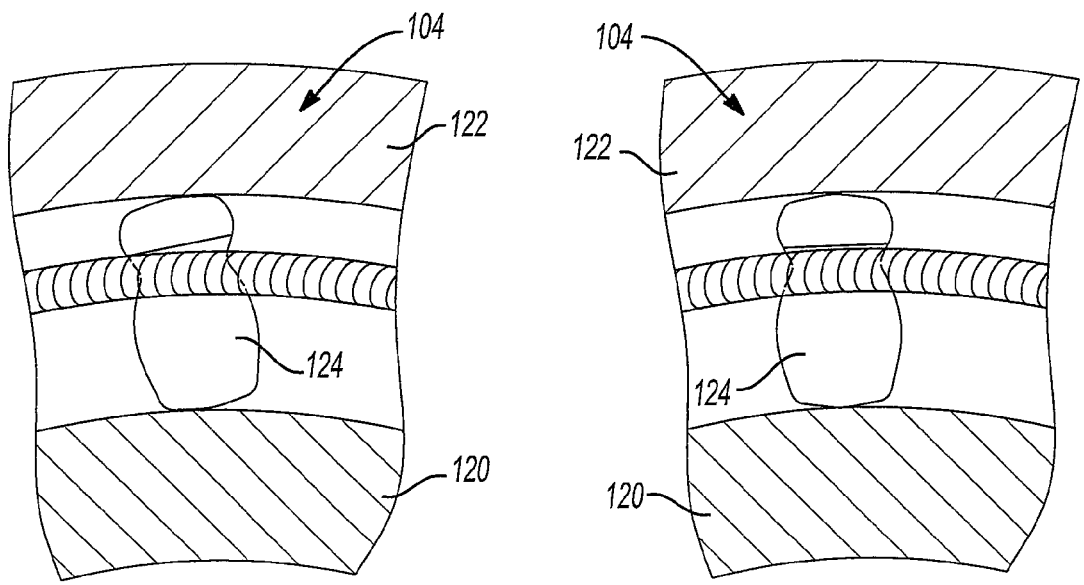
*Fig-7*  *Fig-8*

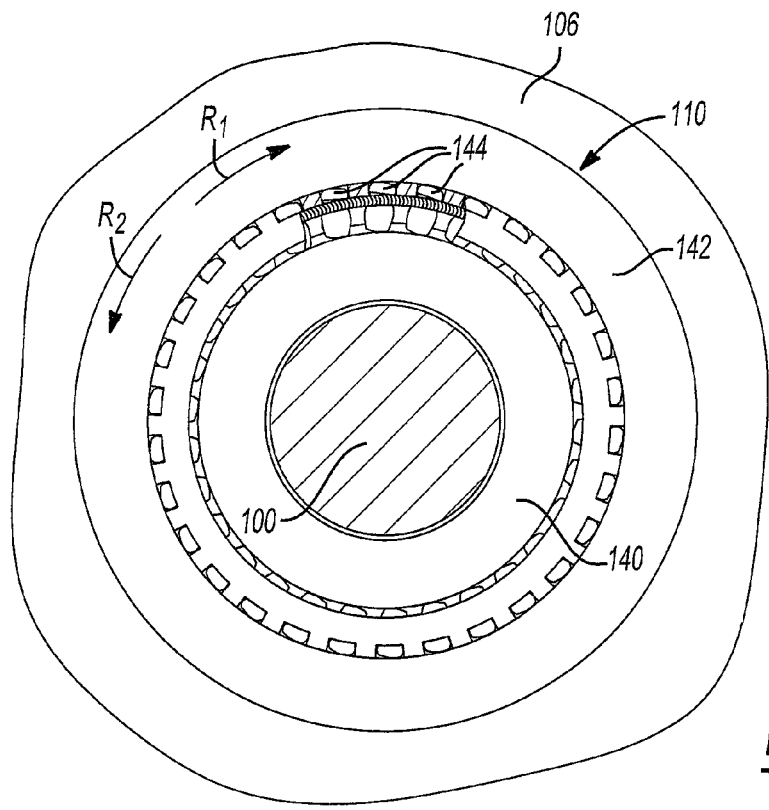
*Fig-11*
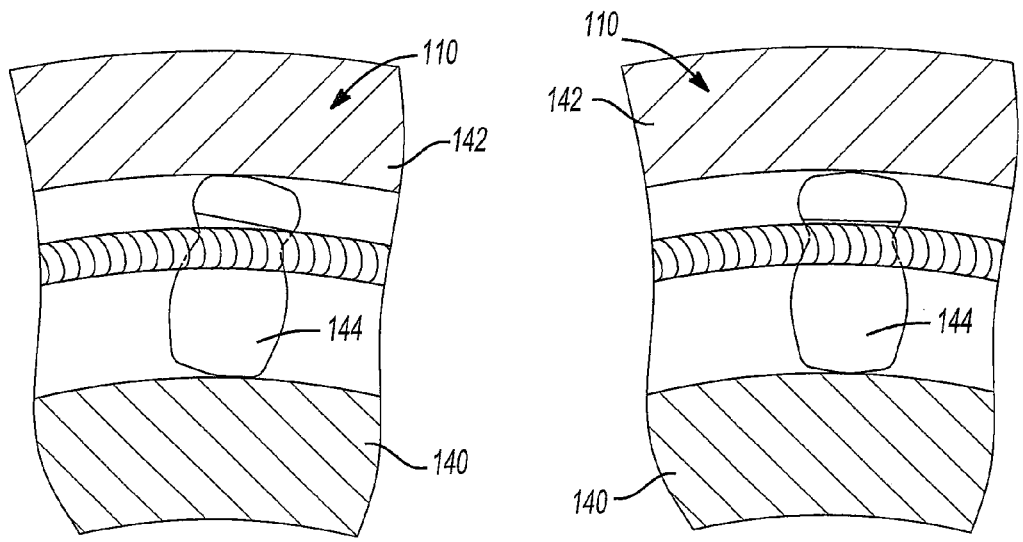
*Fig-12*  *Fig-13*

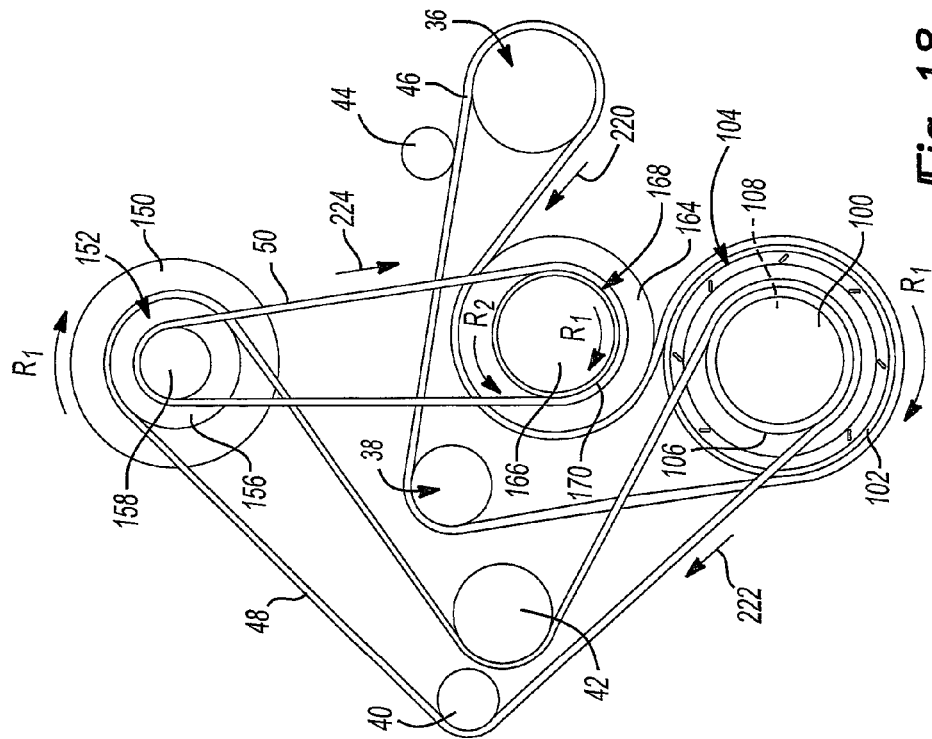
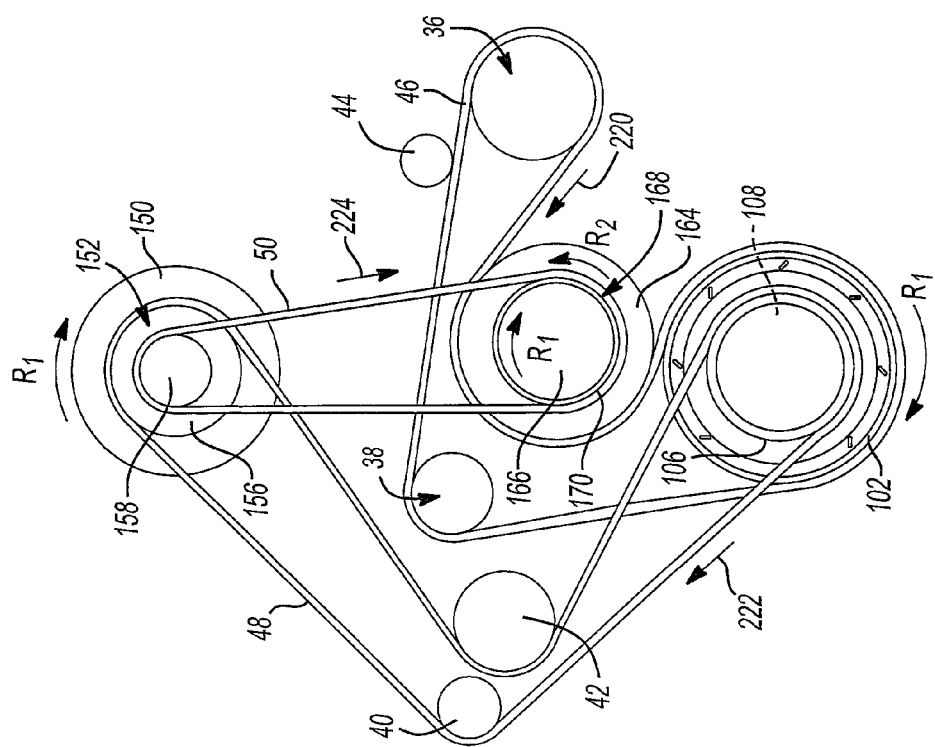

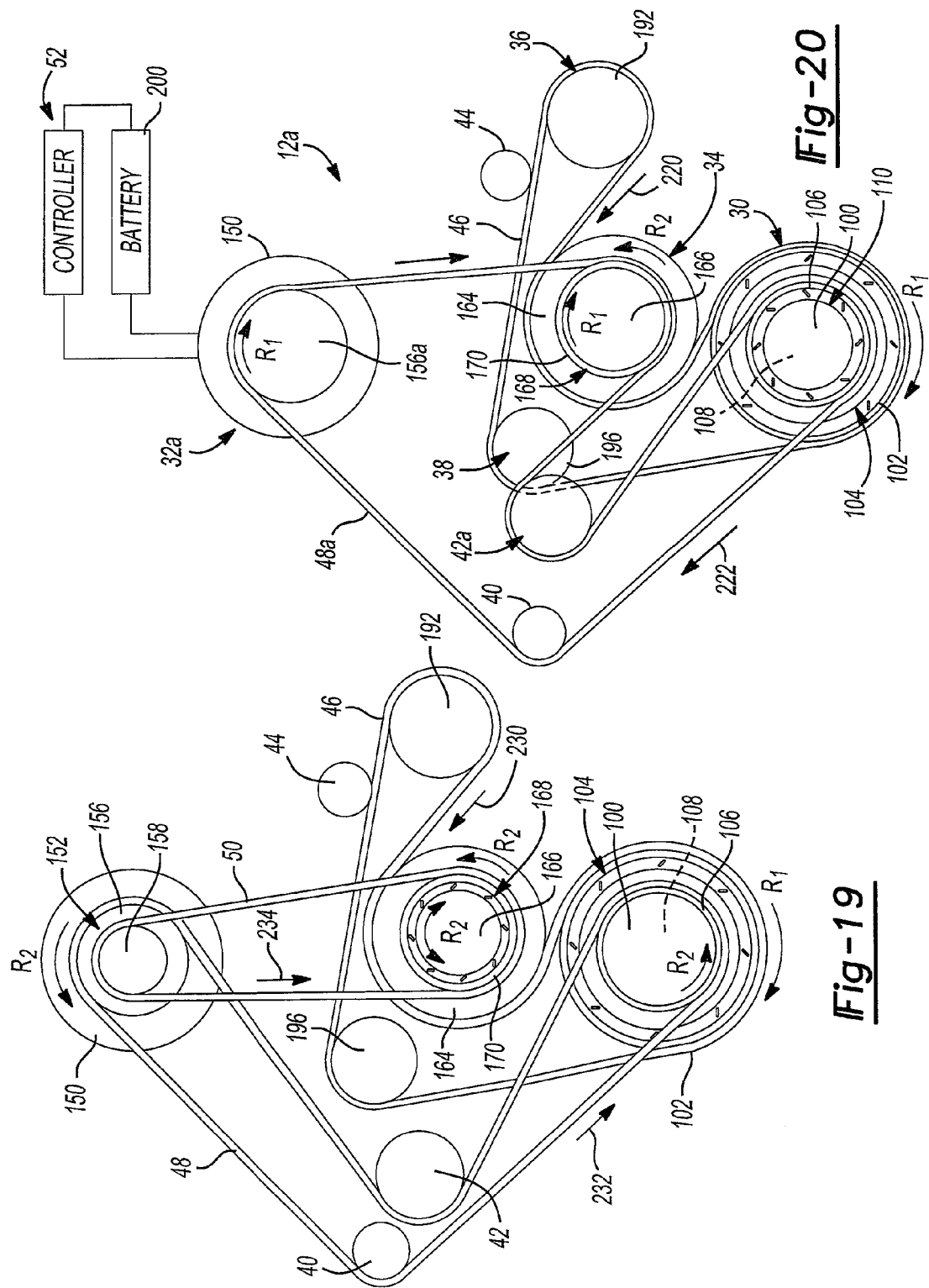

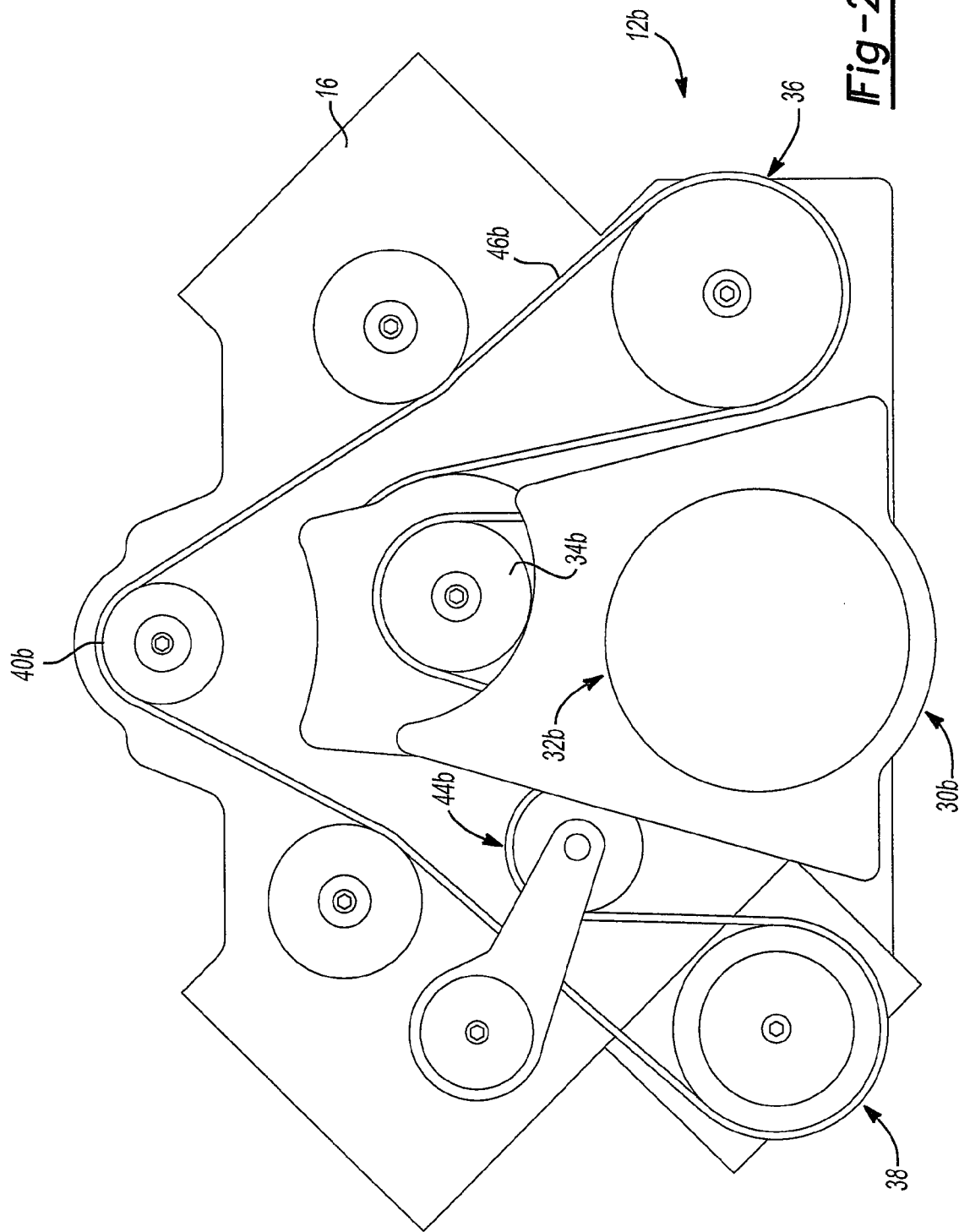

ENGINE POWERED DEVICE HAVING ACCESSORY DRIVE AND REVERSING MOTOR FOR SELECTIVELY STARTING ENGINE AND POWERING ACCESSORY DRIVE This application claims the benefits of U.S. Provisional Patent Application No. 61/056,199, filed May 27, 2008.

INTRODUCTION

The present disclosure generally relates to power transmitting systems for engine powered equipment and methods for their operation. More particularly, the present disclosure relates to a power transmitting system having both idle-stop (IS) functionality and belt-alternator/generator-starter (BAS) functionality, as well as a method for operating a vehicle power transmitting system.

IS functionality can be employed in a vehicle to control the operation of an internal combustion engine when propulsive power from the internal combustion engine is not needed, such as when the vehicle is stopped at a traffic light or a rail road crossing. In known systems, a control system interacts with the engine to shut the engine down in appropriate situations. When the control system determines that the engine should be restarted, a motor can be operated to cause the engine crankshaft to spin. In some idle stop systems, an electric motor is disposed between the engine crankshaft and an input of the transmission. In an IS system that employs BAS functionality, a generator, such as an alternator, is employed as a motor to turn the crankshaft via a belt.

It will be appreciated that various vehicle accessories that are typically driven by the engine through a front end accessory drive belt. Such vehicle accessories can include water pumps, fans, air conditioning compressors and power steering pumps. These vehicle accessories will not be operational when the engine is shut down. To address this situation, it has been proposed that an electrically-driven auxiliary unit be employed. Such auxiliary unit would include, for example, an auxiliary air conditioning compressor, an auxiliary power steering pump and an electric motor for selectively driving the auxiliary air conditioning compressor and the auxiliary power steering pump. Fluid conduits would couple the auxiliary air conditioning compressor to the air conditioning compressor and the auxiliary power steering pump to the power steering pump and would provide fluid pressure to operate the vehicle air conditioning system and steering system at times in which the internal combustion engine was shut down. We have noted, however, that configuration of a vehicle in this manner requires significant redundancy that is both costly and difficult to package into a vehicle.

Another system that has been proposed is disclosed in PCT Patent Application No. PCT/CA08/000550 entitled "Starter and Accessory Drive System and Method for Hybrid Drive Vehicles". In this system, a large clutch is employed to decouple the front end accessory drive (FEAD) system from the crankshaft of the engine so that the starter can be employed to drive the vehicle accessories (via the FEAD belt) when the engine has been shut down. Configuration in this manner, however, requires a relatively large and costly clutch, as well as related controls for operating the clutch.

SUMMARY

In one form, the present teachings provide a device having an engine, a motor/generator and an accessory system having an accessory that is driven by rotary power. The device can be operated in a first mode in which the engine provides rotary power for driving the accessory and the motor/generator. The device can be operated in a second mode for starting the engine and driving the accessory in which rotary power is output from the motor/starter in a first rotational direction. The device can also be operated in a third mode in which the motor/generator outputs rotary power in a second, opposite rotational direction for driving the accessory while the engine is not operating In another form, the present teachings provide a device that includes an engine having an output member, a first drive assembly, a motor/generator and an accessory drive system. The first drive assembly has an input member, a first drive member, a second drive member, a first clutch, a second clutch and a third clutch. The input member is coupled to an output of the engine. The first clutch is configured to couple the input member to the first drive member when the output member of the engine is driving the input member. The second and third clutches couple the second drive member to the input member. The second clutch is operable in an engaged mode to transmit rotary power from the input member to the second drive member and a disengaged mode in which the second clutch does not transmit rotary power between the input member and the second drive member. The third clutch is operable in an engaged mode to transmit rotary power in a first rotational direction from the second drive member to the input member and a disengaged condition in which rotary power is not transmitted through the third clutch between the input member and the second drive member. The motor/generator has a shaft and is operable in a first mode, in which rotary power is input to the motor/generator and the motor/generator outputs electric power, a second mode in which electric power is input to the motor/generator to cause the shaft of the motor/generator to rotate in the first rotational direction, and a third mode in which electric power is input to the motor/generator to cause the shaft of the motor/generator to rotate in a second rotational direction opposite the first rotational direction. The accessory drive system has an accessory endless power transmitting member (accessory EPT) and an accessory assembly with an accessory, a third drive member, a fourth drive member and a fourth clutch. The accessory EPT is coupled to the first drive member and the third drive member to transmit rotary power therebetween. The third drive member is coupled for rotation with an input shaft of the accessory. The fourth clutch is configured to inhibit transmission of rotary power between the fourth drive member and the input shaft of the accessory when the fourth drive member is driven in the first rotational direction. The fourth clutch is configured permit transmission of rotary power between the fourth drive member and the input shaft of the accessory when the fourth drive member is driven in the second rotational direction. The device further includes a coupling means for coupling the shaft of the motor/generator to the second drive member and for coupling the shaft of the motor/generator to the fourth drive member.

In another form, the present teachings provide a method that includes: providing a device with engine, an accessory drive system and a motor/generator, the engine having an output member, the accessory drive system including an accessory that is driven by rotary power; operating the device in a first mode in which the engine generates rotary power that is output from the output member in a first rotational direction, the rotary power driving the accessory of the accessory drive system and rotating the motor/generator such that the motor/generator produces electrical energy; operating the device in a second mode in which the motor/generator generates rotary power that is output in the first rotational direction to drive the output member of the engine, wherein a portion of the rotary power is transmitted through a first clutch and a second clutch to drive the accessory of the accessory drive system; and operating the device in a third mode in which the motor/generator generates rotary power that is output in a second rotational direction opposite the first rotational direction, the rotary power being transmitted through a third clutch to drive the accessory of the accessory drive system. In the third mode, the second clutch prevents the rotary power from being transmitted to the output member of the engine.

Further areas of applicability will become apparent from the description provided herein. It should be understood that the description and specific examples are intended for purposes of illustration only and are not intended to limit the scope of the present disclosure, its application and/or uses in any way.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

FIG. 6 is an elevation view in partial section of a portion of the PTS, illustrating the crankshaft pulley and the first clutch in more detail;

FIGS. 7 and 8 are enlarged views of a portion of FIG. 6, illustrating the first clutch in a disengaged condition and an engaged condition, respectively;

FIG. 11 is an elevation view in partial section of a portion of the PTS, illustrating the starter pulley and the third clutch in more detail;

FIGS. 12 and 13 are enlarged views of a portion of FIG. 11, illustrating the third clutch in a disengaged condition and an engaged condition, respectively;

FIGS. 17 through 19 are schematic illustrations of the PTS similar to that of FIG. 3 but illustrating the PTS operating in a first mode, a second mode and a third mode, respectively;

FIG. 20 is a schematic illustration of another PTS constructed in accordance with the teachings of the present disclosure;

FIG. 23 is a front elevation view illustrating another PTS constructed in accordance with the teachings of the present disclosure as coupled to an engine;

DETAILED DESCRIPTION OF THE VARIOUS EMBODIMENTS

First Example

Figure 1:
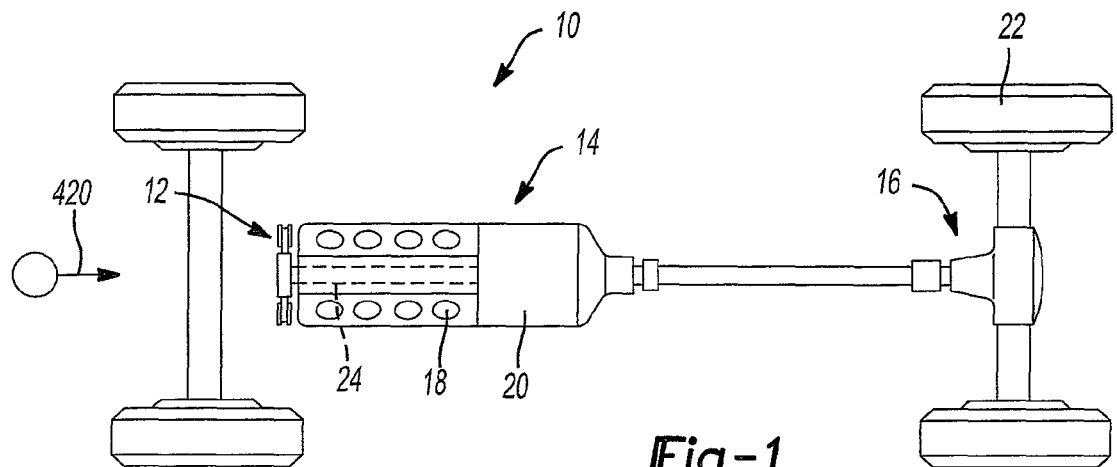
FIG. 1 is a schematic illustration of a vehicle with an exemplary power transmitting system (PTS) constructed in accordance with the teachings of the present disclosure.
Figure 2:
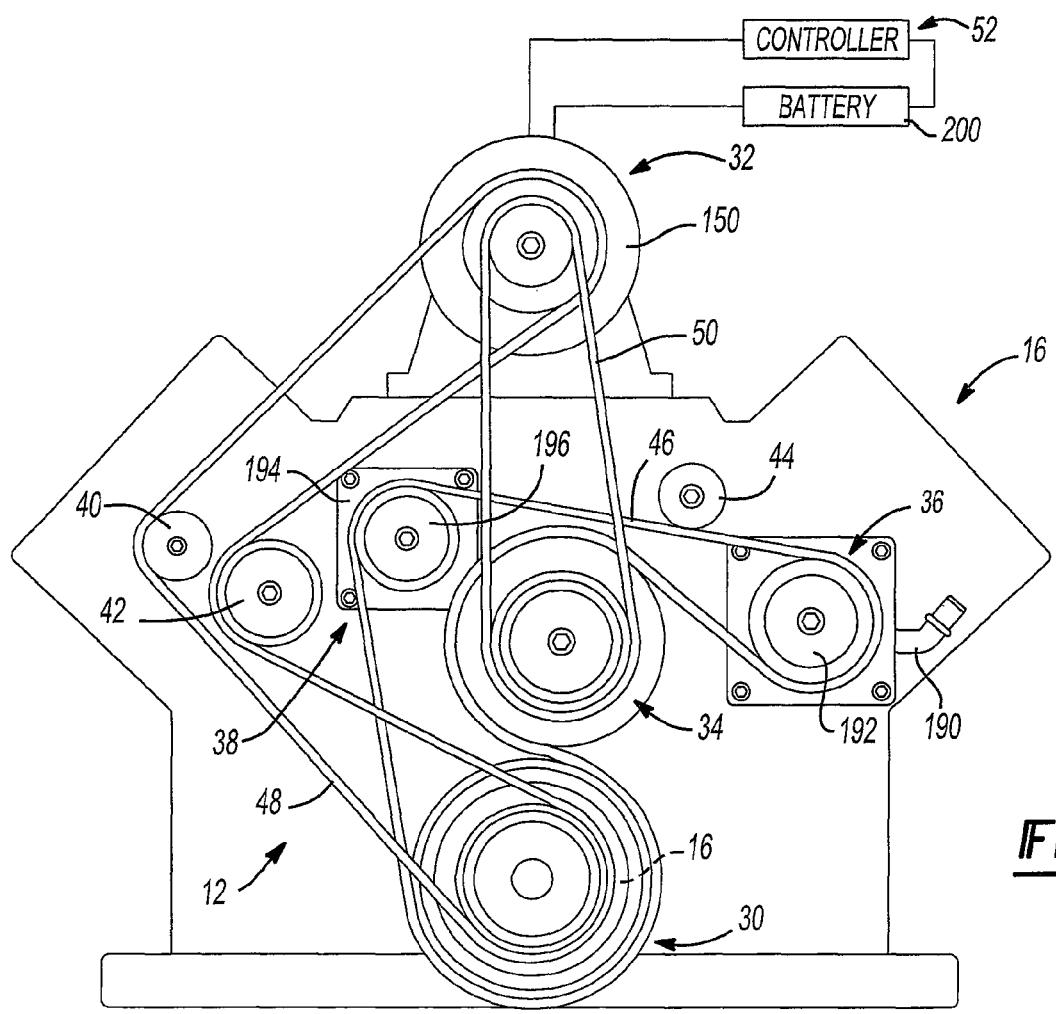
FIG. 2 is a front elevation view of a portion of the vehicle of FIG. 1, illustrating the engine and PTS in more detail.

With reference to FIGS. 1 and 2 of the drawings, vehicle 10 having a power transfer system (PTS) 12 constructed in accordance with the teachings of the present disclosure is illustrated. The vehicle 10 can include a powertrain 14 and a drivetrain 16. The powertrain 14 can include a propulsive power source, such as an internal combustion engine 18, and a transmission 20. The transmission 20 can receive rotary power from the internal combustion engine 18 and transmit the propulsive power to the drivetrain 16 to drive a set of driven wheels 22.

With reference to FIGS. 2 through 5, a crankshaft 24 of the engine 18 can be coupled to the PTS 12 to power various vehicle accessories. In the particular example provided, the PTS 12 can include a crankshaft pulley assembly 30, a motor/generator assembly 32, a water pump assembly 34, a power steering pump assembly 36, an air conditioning compressor assembly 38, an idler assembly 40, a first tensioner assembly 42, a second tensioner assembly 44, a front end accessory drive (FEAD) belt 46, a belt-alternator-starter (BAS) belt 48, an idle-stop accessory function (ISAF) belt 50 and a control assembly 52.

Figure 4:
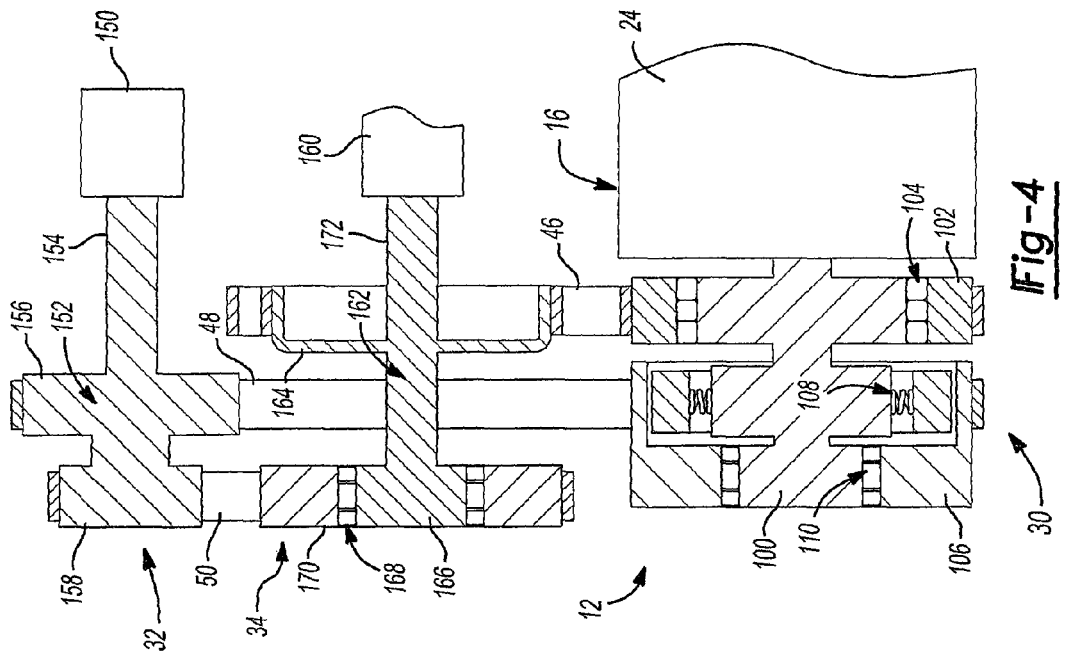
FIG. 4 is a schematic cross-sectional representation of the PTS.
Figure 3:
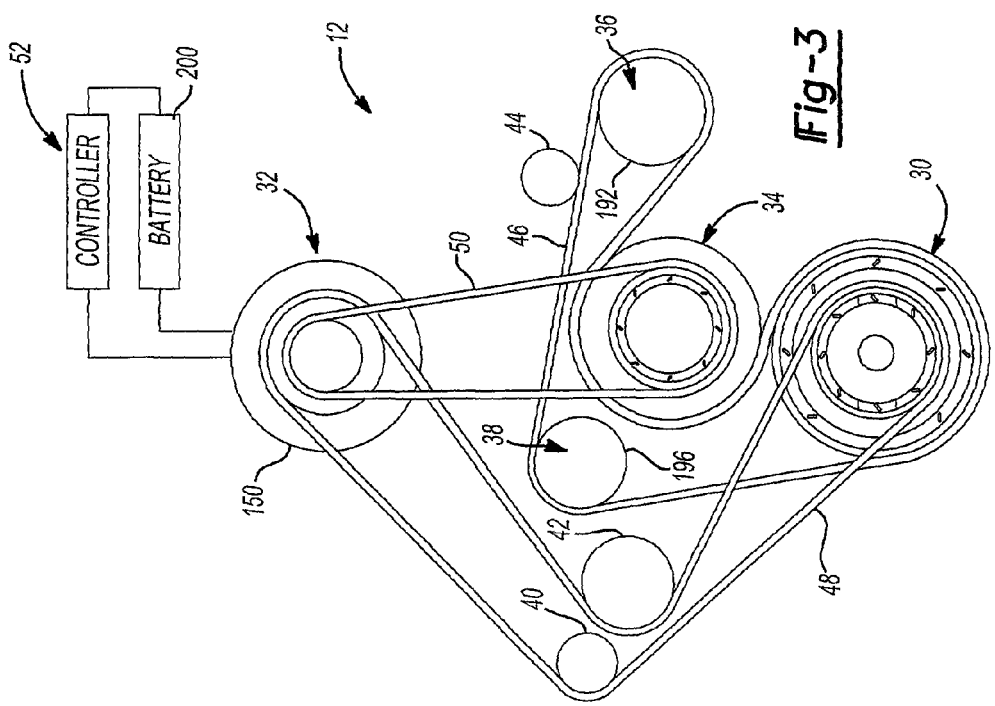
FIG. 3 is a schematic representation of the PTS.
Figure 5:
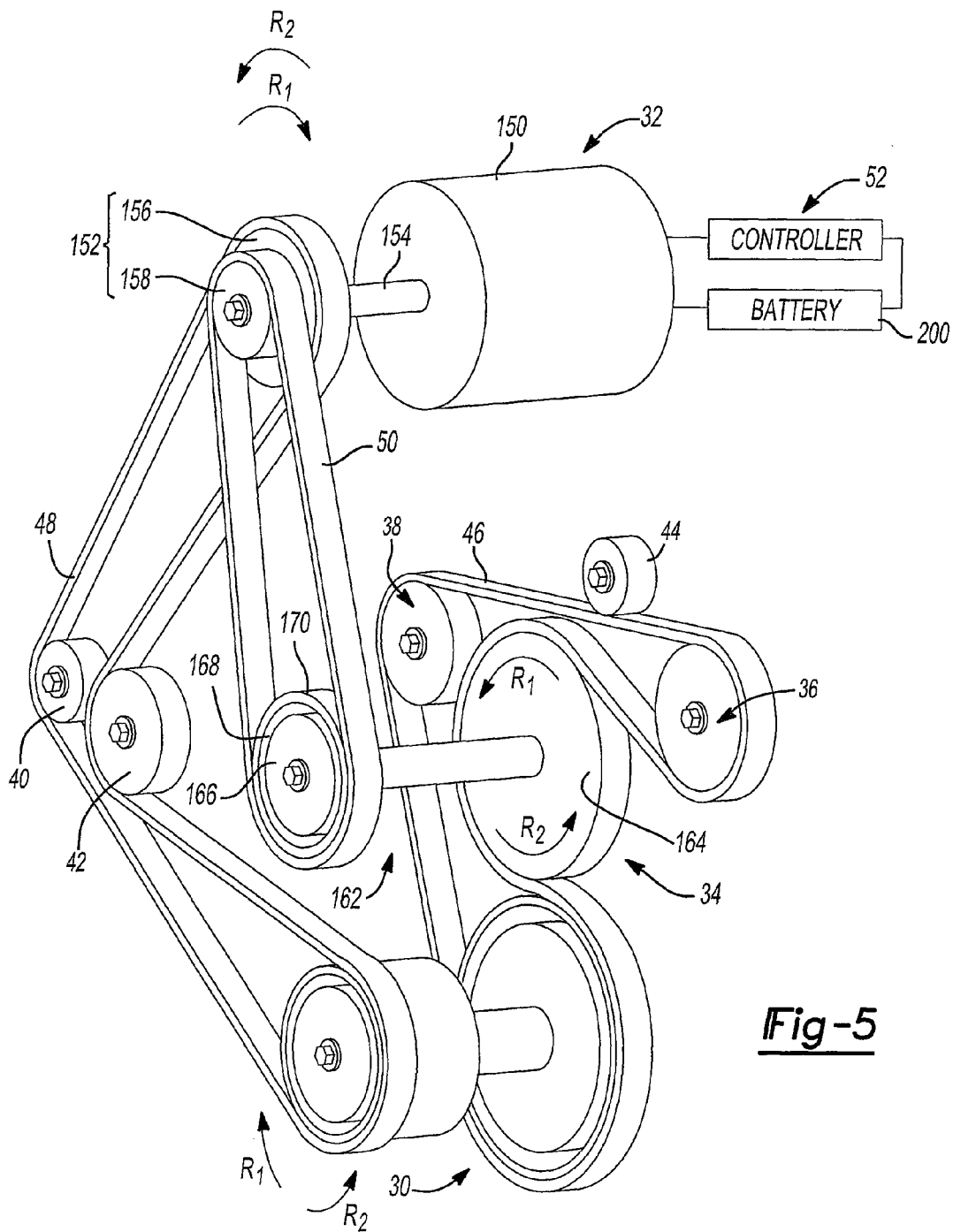
FIG. 5 is a schematic perspective view of a portion of the PTS.

With reference to FIGS. 4 and 5, the crankshaft pulley assembly 30 can include an inner hub 100, crankshaft pulley 102, a first clutch 104, a starter pulley 106, a second clutch 108, and a third clutch 110. The inner hub 100 can be coupled for rotation with the crankshaft 24 of the engine 18. The first, second and third clutches 104, 108 and 110 can be any type of clutch that can be employed to selectively couple the inner hub 100 to the crankshaft pulley 102 and/or the crankshaft pulley 102 in a desired manner. The first and third clutches 104 and 110 are clutches that can be employed to selectively transmit rotary power based on the direction in which power is being input to the clutch and/or the speed difference between the input and output sides of the clutch. Examples of suitable clutches include clutches that can overrun, such as sprag clutches, freewheeling clutches, cam clutches, roller clutches, roller ramp clutches and tapered roller clutches of the type that are commercially available from Borg Warner, Formsprag, GMN, Koyo, Morse and Stieber, as well as (wrap) spring clutches of the type that are commercially available from Litens Automotive Partnership, Dnyacorp, REELL Precision Manufacturing Corporation, and Warner Electric. The second clutch 108 can be a locking clutch, such as a centrifugal clutch, a magnetic clutch, a hydraulic clutch, or a pneumatic clutch. In the particular example provided, the first and third clutches 104 and 110 are mechanical sprag clutches, while the second clutch 108 is a centrifugal clutch.

With reference to FIGS. 6 through 8, the first clutch 104 can include an inner clutch race 120, which can be coupled for rotation with the inner hub 100, an outer clutch race 122, which can be non-rotatably coupled to the crankshaft pulley 102, and a plurality of sprags 124 that are disposed between the inner clutch race 120 and the outer clutch race 122. The sprags 124 can pivot between the inner clutch race 120 and the outer clutch race 122 between an overrunning position (FIG. 7) and a locked or engaged position (FIG. 8). In the overrunning position, the sprags 124 are pivoted (through motion of the inner clutch race 120 relative to the outer clutch race 122) such that they are not wedged between the inner and outer clutch races 120 and 122 to thereby permit the outer clutch race 122 to rotate at a speed that is relatively faster than a rotational speed of the inner clutch race 120. In the engaged position, the sprags 124 are pivoted (through motion of the inner clutch race 120 relative to the outer clutch race 122) such that they are wedged between the inner and outer clutch races 120 and 122 to thereby rotationally lock the outer clutch race 122 to the inner clutch race 120. The first clutch 104 can be installed to the inner hub 100 and the crankshaft pulley 102 such that rotary power can be transmitted from the inner hub 100 to the crankshaft pulley 102 in a first rotational direction (R1), but cannot be transmitted between the inner hub 100 an the crankshaft pulley 102 when the crankshaft pulley 102 is rotating in the first rotational direction (R1) at a speed that is higher than the rotational speed of the inner hub 100.

Figure 9:
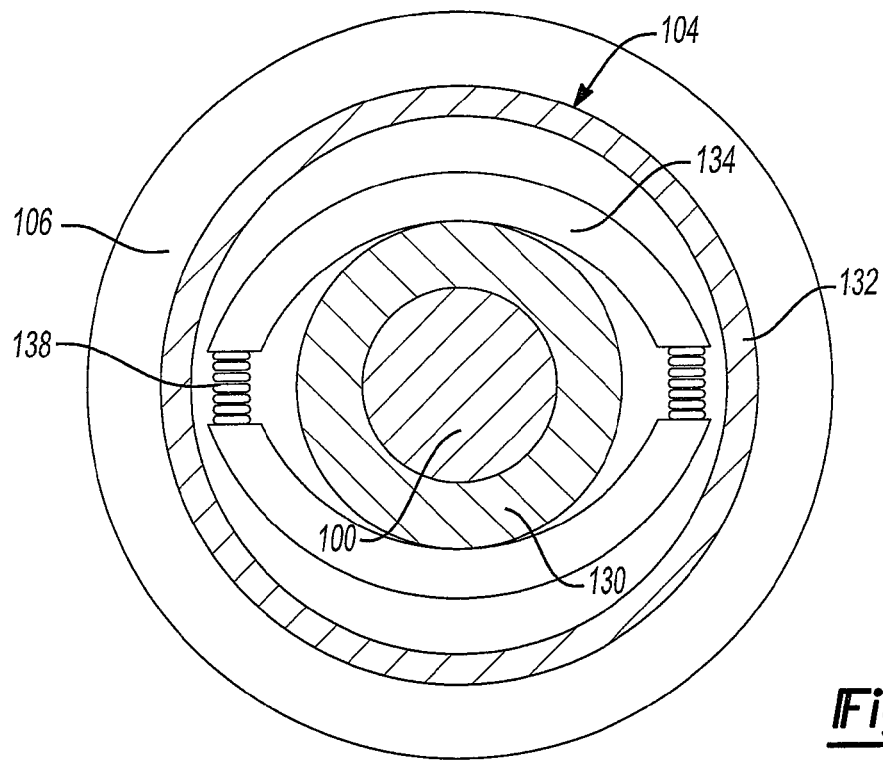
FIGS. 9 and 10 are elevation views in partial section of a portion of the PTS that illustrate the starter pulley and the second clutch in a disengaged condition and an engaged condition, respectively.
Figure 10:
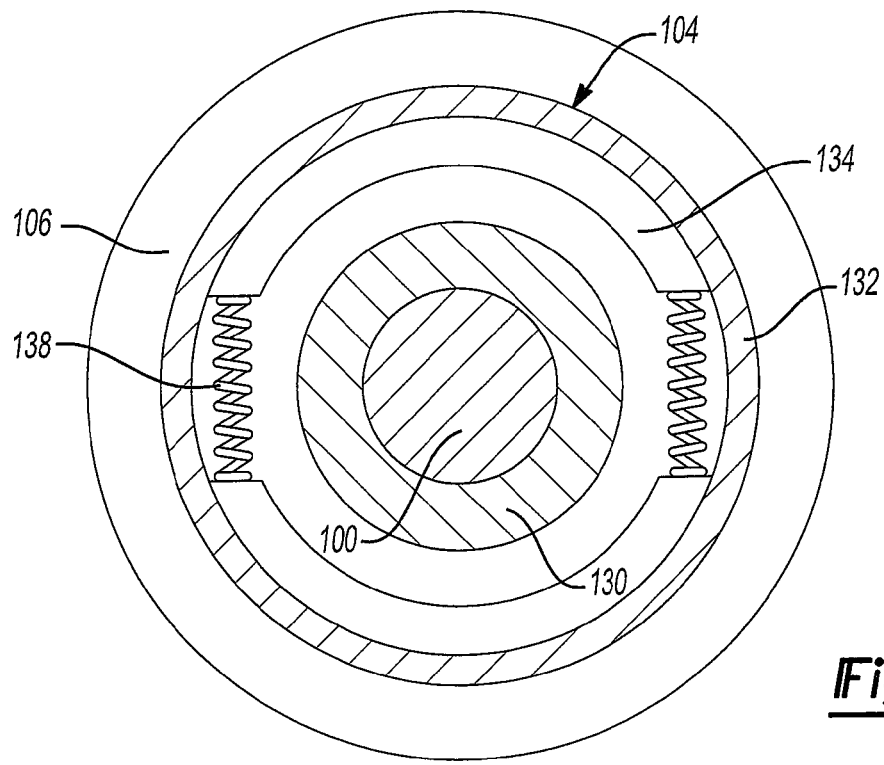

With reference to FIGS. 4, 9 and 10, the second clutch 108 can include an inner clutch member 130, which can be coupled for rotation with the inner hub 100, an outer clutch member 132, which can be non-rotatably coupled to the starter pulley 106, and a plurality of clutch members 134. The clutch members 134 can be non-rotatably coupled to the inner clutch member 130 and can move radially outwardly in response to a centrifugal force acting on the clutch members 134 when the inner clutch member 130 is rotated at a speed that is greater than or equal to a predetermined rotational speed to thereby engage the outer clutch member 132 as shown in FIG. 10. Accordingly, it will be appreciated that rotary power cannot be transmitted from the crankshaft 24 through the second clutch 108 to the starter pulley 106 when a rotational speed of the crankshaft 24 is less than the predetermined rotational speed. The predetermined speed can be any desired rotational speed, such as a speed that is less than an idle speed of the engine 18. For example, the predetermined speed can be about 300 rotations per minute to about 500 rotations per minute.

The third clutch 110 can include an inner clutch race 140, which can be coupled for rotation with the inner hub 100, an outer clutch race 142, which can be non-rotatably coupled to the starter pulley 106, and a plurality of sprags 144 that are disposed between the inner clutch race 140 and the outer clutch race 142. Like the sprags 124 (FIG. 6) of the first clutch 104 (FIG. 6), the sprags 144 can pivot between the inner clutch race 140 and the outer clutch race 142 between an overrunning position (FIG. 12) and a locked or engaged position (FIG. 13). In the overrunning position, the sprags 144 are pivoted (through motion of the inner clutch race 140 relative to the outer clutch race 142) such that they are not wedged between the inner and outer clutch races 140 and 142 to thereby permit the outer clutch race 142 to rotate at a speed that is relatively faster than a rotational speed of the inner clutch race 140. In the engaged position, the sprags 144 are pivoted (through motion of the inner clutch race 140 relative to the outer clutch race 142) such that they are wedged between the inner and outer clutch races 140 and 142 to thereby rotationally lock the outer clutch race 142 to the inner clutch race 140. The third clutch 110 can be installed to the inner hub 100 and the starter pulley 106 such that rotary power can be transmitted from the starter pulley 106 to the inner hub 100 when the starter pulley 106 rotates in the first rotational direction (R1), but cannot be transmitted from the inner hub 100 to the starter pulley 106 when the inner hub 100 rotates in the first rotational direction (R1) or from the starter pulley 106 to the inner hub 100 when the starter pulley 106 is rotated in a second rotational direction (R2) that is opposite the first rotational direction (R1).

Returning to FIGS. 4 and 5, the motor/generator assembly 32 can include a motor/generator 150 and a compound pulley 152 that can be mounted on a shaft 154 of the motor/generator 150. The motor/generator 150 can be a conventional motor/generator than can be operated in a first mode for generating electric power from rotary motion that is input to the motor/generator 150, a second mode for converting electric power into rotary motion that causes the compound pulley 152 to rotate in the first rotational direction (R1), and a third mode for converting electric power into rotary motion that causes the compound pulley 152 to rotate in the second rotational direction (R2). The compound pulley 152 can include a starter/generator pulley 156 and a motor front end accessory drive (motor FEAD) pulley 158. In the particular example provided, the compound pulley 152 is unitarily formed but those of skill in the art will appreciate that the first compound pulley 152 could be formed of a pair of discrete pulleys that are coupled to the shaft 154 of the motor/generator 150 for rotation therewith.

The water pump assembly 34 can include a water pump 160 (only partly shown) and a pulley assembly 162. The water pump 160 can be a conventional water pump that can be employed to circulate engine coolant through the engine 18. The pulley assembly 162 can include a water pump pulley 164, a FEAD driver pulley hub 166, a fourth clutch 168 and a FEAD driver pulley 170. The water pump pulley 164 can be coupled to a shaft 172 of the water pump 160. The FEAD driver pulley hub 166 can be non-rotatably coupled to the shaft 172 of the water pump 160 and in the particular example provided, is unitarily formed with the water pump pulley 164. The fourth clutch 168 can be disposed between the FEAD driver pulley hub 166 and the FEAD driver pulley 170 and can be configured to selectively couple the FEAD driver pulley 170 and the FEAD driver pulley hub 166 to permit rotary power to be transmitted therebetween.

Figure 14:
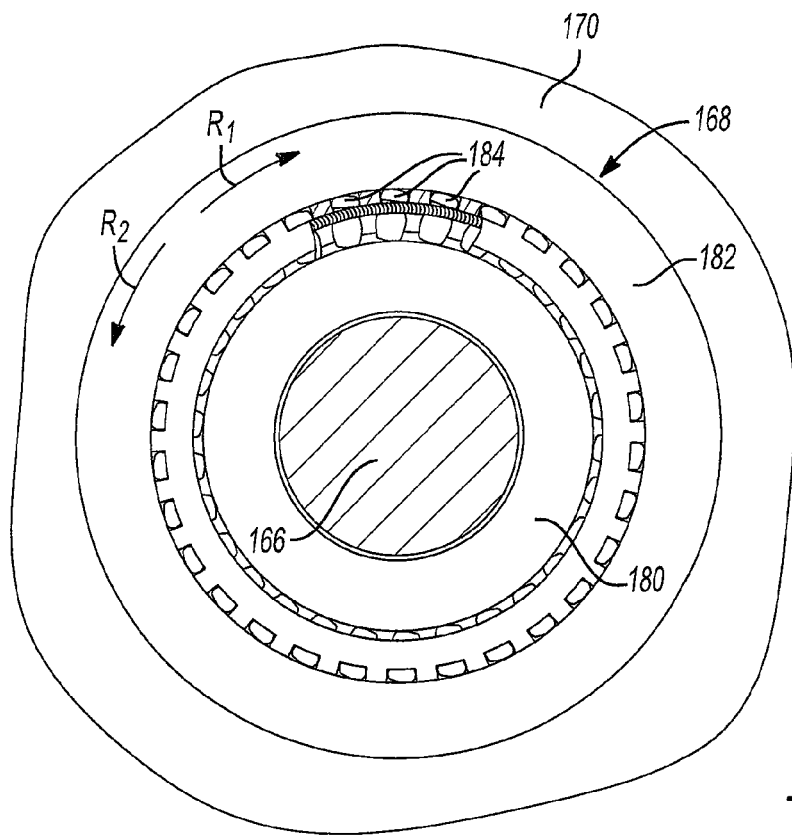
FIG. 14 is an elevation view in partial section of a portion of the PTS, illustrating the FEAD driver pulley and the fourth clutch in more detail.
Figures 15, 16:
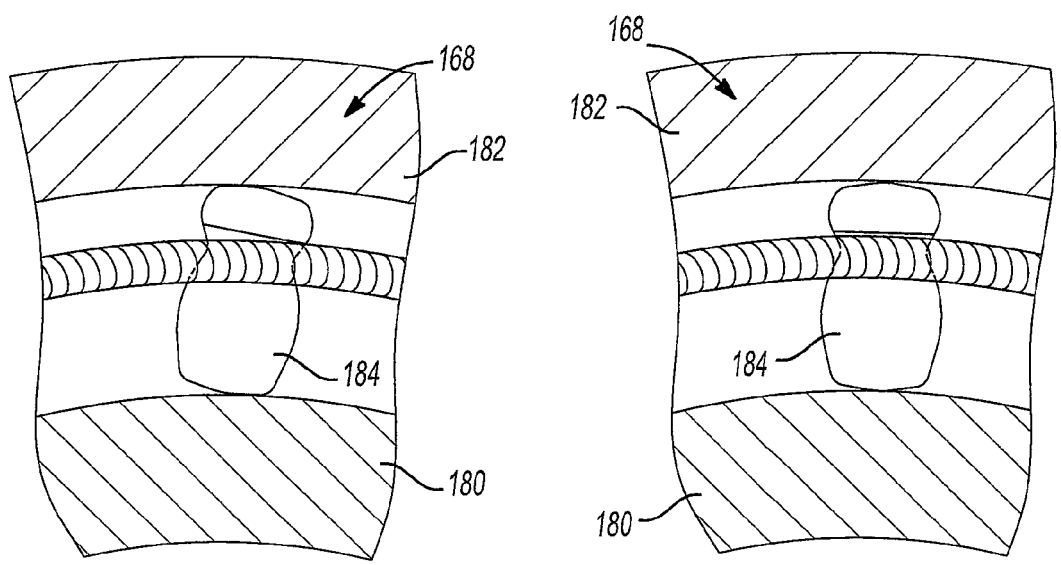
FIGS. 15 and 16 are enlarged views of a portion of FIG. 14, illustrating the fourth clutch in a disengaged condition and an engaged condition, respectively.

With additional reference to FIGS. 14 through 16, the fourth clutch 168 can include an inner clutch race 180, which can be coupled for rotation with the FEAD driver pulley hub 166 of the water pump, an outer clutch race 182, which can be non-rotatably coupled to the FEAD driver pulley 170, and a plurality of sprags 184 that are disposed between the inner clutch race 180 and the outer clutch race 182. Like the sprags 124 (FIG. 6) of the first clutch 104 (FIG. 6), the sprags 184 can pivot between the inner clutch race 180 and the outer clutch race 182 between an overrunning position (FIG. 15) and a locked or engaged position (FIG. 16). In the overrunning position, the sprags 184 are pivoted (through motion of the inner clutch race 180 relative to the outer clutch race 182) such that they are not wedged between the inner and outer clutch races 180 and 182 to thereby permit the outer clutch race 182 to rotate at a speed that is relatively faster than a rotational speed of the inner clutch race 180. In the engaged position, the sprags 184 are pivoted (through motion of the inner clutch race 180 relative to the outer clutch race 182) such that they are wedged between the inner and outer clutch races 180 and 182 to thereby rotationally lock the outer clutch race 182 to the inner clutch race 180. The fourth clutch 168 can be installed to the FEAD driver pulley hub 166 and the FEAD driver pulley 170 such that rotary power is not transmitted from the FEAD driver pulley 170 to the shaft 172 when the FEAD driver pulley 170 rotates in the first rotational direction (R1) but is transmitted from the FEAD driver pulley 170 to the shaft 172 when the FEAD driver pulley 170 is rotated in the second rotational direction (R2).

Returning to FIGS. 2 and 3, the power steering pump assembly 36 can include a conventional power steering pump 190 and a conventional power steering pump pulley 192. Similarly, the air conditioning compressor assembly 38 can include a conventional air conditioning compressor 190 and a conventional air conditioning compressor pulley 192. Various idler pulleys and tensioner assemblies can be employed to route and tension the belts that are associated with the PTS 12. In the particular example provided, the idler assembly 40 and first tensioner assembly 42 are employed to route and tension the BAS belt 48 and the second tensioner assembly 44 is employed to tension the FEAD belt 46. A third tensioner assembly (not shown) could be employed to tension the ISAF belt 50, but a cogged belt is employed in the particular embodiment illustrated. Accordingly, it will be appreciated that the BAS belt 48 can be employed to transmit power between the starter pulley 106 and the starter/generator pulley 156, while the FEAD belt 46 can be employed to transmit power between the water pump pulley 164, the power steering pump pulley 192, the air conditioning compressor pulley 192 and the crankshaft pulley 102, while the ISAF belt 50 can be employed to transmit power between the motor FEAD pulley 158 and the FEAD driver pulley 170.

The control assembly 52 can be coupled to the motor/generator 150 and a source of electrical power, such as a battery 200. As used herein, the term control assembly refers to an application specific integrated circuit (ASIC), an electronic circuit, a processor (shared, dedicated or group) and memory that executes one or more software or firmware programs, a combinational logic circuit, or other suitable components that provide the described functionality. The control assembly 52 can cause the motor/generator 150 to selectively operate in either the first mode (for generating electric power that can be transmitted to the battery 200), the second mode (for producing rotary power in the first rotational direction (R1) from electricity provided by the battery 200), or the third mode (for producing rotary power in the second rotational direction (R2) from electricity provided by the battery 200).

First Example

Engine Powered Operation

With reference to FIGS. 4, 5 and 7, the engine 18 can be operated to propel the vehicle 10 (FIG. 1) such that the crankshaft 24 will rotate in the first rotational direction (R1) at a speed above the predetermined rotational speed. As the inner hub 100 is coupled for rotation with the crankshaft 24, the first clutch 104 will operate in an engaged condition (rotary power is being transmitted from the inner hub 100 to the crankshaft pulley 102 in a first rotational direction (R1) and in the example provided, the sprags 124 (FIG. 8) are disposed in the engaged position), the second clutch 108 will operate in an engaged condition (in the example provided, the clutch members 134 (FIG. 10) have moved outwardly in response to centrifugal force and frictionally engaged the outer clutch member 132), the third clutch 110 can operate in a disengaged condition (rotary power is being applied to the inner hub 100 and in the example provided, the sprags 144 are disposed in the overrunning position).

Power is transmitted from the crankshaft 24, through the inner hub 100, the first clutch 104 and the crankshaft pulley 102 (rotates in the first rotational direction (R1)), and to the water pump pulley 164 (rotates in the second rotational direction (R2)), as well as the power steering pump pulley 192 and the air conditioning compressor pulley 192, via the FEAD belt 46 (moves in the direction of arrow 220) to power the water pump 160, the air conditioning compressor 190 and the power steering pump 190. Power is also transmitted from the crankshaft 24, the inner hub 100, the second clutch 108 and the starter pulley 106 (rotates in the first rotational direction (R1)) to the starter/generator pulley 156 (rotates in the first rotational direction (R1)) via the BAS belt 48 (moves in the direction of arrow 222) to power the motor/generator 150 and to drive the motor FEAD pulley 158 in the first rotational direction (R1). Rotation of the motor FEAD pulley 158 moves the ISAF belt 50 in the direction of arrow 224, which causes the FEAD driver pulley 170 to rotate in the first rotational direction (R1) so that the fourth clutch 168 operates in a disengaged condition (in the example provided, the sprags 184 (FIG. 15) are disposed in the overrunning position as the shaft 172 (FIG. 15) is being driven in the second rotational direction (R2) via the water pump pulley 164 while the FEAD driver pulley 170 is being driven in the first rotational direction (R1)). Accordingly, power is not transmitted from the FEAD driver pulley 170 to the water pump 160 or the Water pump pulley 164.

First Example

BAS Operation

With reference to FIGS. 4, 5 and 8, the engine 18 can be in a condition in which the crankshaft 24 is not rotating, as when the engine 18 has been shut down in accordance with an idle-stop control methodology and is required to be re-started. The control assembly 52 can be operated to cause the motor/generator 150 to operate in the second mode such that electrical power from the battery 200 is employed to drive the compound pulley 152 in the first rotational direction (R1). The motor FEAD pulley 158 (which rotates in the first rotational direction (R1)) can drive the ISAF belt 50 in the direction of arrow 224 to cause the FEAD driver pulley 170 to rotate in the first rotational direction (R1) so that the fourth clutch 168 operates in a disengaged condition. Accordingly, power is not transmitted via the ISAF belt 50 from the FEAD driver pulley 170 to the water pump 160 or the water pump pulley 164. The starter/generator pulley 156 (which rotates in the first rotational direction (R1)) can drive the BAS belt 48 in the direction of arrow 222 to cause the starter pulley 106 to rotate in the first rotational direction (R1). As rotary power can be transmitted from the starter pulley 106 to the inner hub 100 when the starter pulley 106 rotates in the first rotational direction (R1), the third clutch 110 operates in an engaged condition to transmit rotary power from the starter pulley 106 to the inner hub 100 and crankshaft 24 so that they rotate in the first rotational direction (R1). As the second clutch 108 is a centrifugal clutch—in the example provided, it will be appreciated that when the rotational speed of the inner hub 100 reaches the predetermined rotational speed, the second clutch 108 can operate in the engaged condition to transmit power between the starter pulley 106 and the inner hub 100. As the inner hub 100 rotates in the first rotational direction (R1), the first clutch 104 will operate in the engaged condition so that rotary power is transmitted from the inner hub 100 to the crankshaft pulley 102 to cause the crankshaft pulley 102 to rotate in the first rotational direction (R1) and drive the FEAD belt 46 in the direction of arrow 220. The water pump pulley 164 (rotates in the second rotational direction (R2)), as well as the power steering pump pulley 192 and the air conditioning compressor pulley 192 are driven by the FEAD belt 46 to power the water pump 160, the power steering pump 190 and the air conditioning compressor 190.

First Example

ISAF Operation

With reference to FIGS. 1 and 11, the engine 18 can be in a condition in which the crankshaft 24 is not rotating, as when the engine 18 has been shut down in accordance with an idle-stop control methodology, but it is desired that the vehicle accessories (i.e., the water pump 160, the power steering pump 190 and the air conditioning compressor 190) remain in operation. The control assembly 52 can be operated to cause the motor/generator 150 to operate in the third mode such that electrical power from the battery 200 is employed to drive the compound pulley 152 in the second rotational direction (R2). The motor FEAD pulley 158 (which rotates in the second rotational direction (R2)) can drive the ISAF belt 50 in the direction of arrow 234 to cause the FEAD driver pulley 170 to rotate in the second rotational direction (R2). The fourth clutch 168 can operate in an engaged condition (rotation of the FEAD driver pulley 170 in the second rotational direction (R2) causes the sprags 184 (FIG. 15) to be positioned in the engaged position in the example provided) to transmit rotary power to the shaft 172 so that the shaft 172 and the water pump pulley 164 rotate in the second rotational direction (R2). The water pump pulley 164 can drive the FEAD belt 46 in the direction of arrow 230 to rotate the power steering pump pulley 192, the air conditioning compressor pulley 192 and the crankshaft pulley 102. The first clutch 104 can operate in a disengaged mode (the crankshaft pulley 102 is rotating in the first rotational direction (R1) at a speed that is higher than the rotational speed of the inner hub 100 in the example provided) and consequently, rotary power is not transmitted through the first clutch 104 to the inner hub 100.

The starter/generator pulley 156 is driven in the second rotational direction by the motor/generator 150 to move the BAS belt 48 in the direction of arrow 232. The BAS belt 48 can drive the starter pulley 106 in the second rotational direction (R2) to cause the third clutch 110 to operate in a disengaged mode so that rotary power is not transmitted from the starter pulley 106 to the inner hub 100. It will be appreciated that as the inner hub 100 is not rotating, the second clutch 108 will not be engaged.

Second Example

Figure 21:
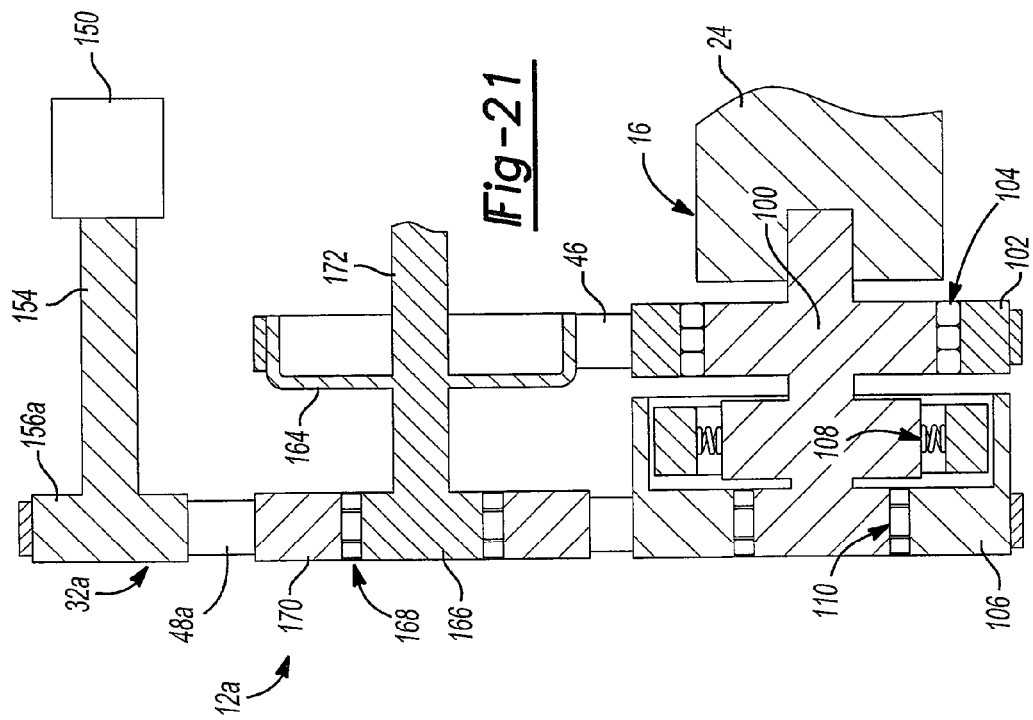
FIG. 21 is a schematic cross-sectional illustration of a portion of the PTS of FIG. 20.

With reference to FIGS. 20 and 21, another PTS constructed in accordance with the teachings of the present disclosure is generally indicated by reference numeral 12a. The crankshaft 24 of the engine 18 can be coupled to the PTS 12a to power various vehicle accessories. In the particular example provided, the PTS 12a can include a crankshaft pulley assembly 30, a motor/generator assembly 32a, a water pump assembly 34, a power steering pump assembly 36, an air conditioning compressor assembly 38, an idler assembly 40, a first tensioner assembly 42a, a second tensioner assembly 44, a FEAD belt 46, a BAS/ISAF belt 50 and a control assembly 52. As the crankshaft pulley assembly 30, the water pump assembly 34, the power steering pump assembly 36, the air conditioning compressor assembly 38, the idler assembly 40, the second tensioner assembly 44, the FEAD belt 46 and the control assembly 52 are described in detail above, further discussion of these components will not be provided.

The motor/generator assembly 32a can be similar to the motor/generator 32 of FIG. 2, except that a single starter/generator pulley 156a is mounted on the shaft 154 of the motor/generator 150. The BAS/ISAF belt 50 is disposed about the starter pulley 106, the starter/generator pulley 156a and the FEAD driver pulley 170, while the idler assembly 40 and the first tensioner assembly 42a are employed to route and tension the BAS/ISAF belt 50.

Second Example

Engine Powered Operation

The engine 18 can be operated such that the crankshaft 24 will rotate in the first rotational direction (R1) at a speed above the predetermined rotational speed. As the inner hub 100 is coupled for rotation with the crankshaft 24, the first clutch 104 will operate in an engaged condition (rotary power is being transmitted from the inner hub 100 to the crankshaft pulley 102 in a first rotational direction (R1) and in the example provided, the sprags 124 (FIG. 8) are disposed in the engaged position), the second clutch 108 will operate in an engaged condition (in the example provided, the clutch members 134 (FIG. 10) have moved outwardly in response to centrifugal force and frictionally engaged the outer clutch member 132), the third clutch 110 can operate in a disengaged condition (rotary power is being applied to the inner hub 100 and in the example provided, the sprags 144 (FIG. 12) are disposed in the overrunning position).

Power is transmitted from the crankshaft 24, through the inner hub 100, the first clutch 104 and the crankshaft pulley 102 (rotates in the first rotational direction (R1)), and to the water pump pulley 164 (rotates in the second rotational direction (R2)), as well as the power steering pump pulley 192 and the air conditioning compressor pulley 192, via the FEAD belt 46 (moves in the direction of arrow 220) to power the water pump 160, the air conditioning compressor 190 and the power steering pump 190. Power is also transmitted from the crankshaft 24, the inner hub 100, the second clutch 108 and the starter pulley 106 (rotates in the first rotational direction (R1)) to the starter/generator pulley 156a (rotates in the first rotational direction (R1)) via the BAS/ISAF belt 50 (moves in the direction of arrow 222) to power the motor/generator 150. The BAS/ISAF belt 50 drives the FEAD driver pulley 170 in the first rotational direction (R1) so that the fourth clutch 168 operates in a disengaged condition (in the example provided, the sprags 184 (FIG. 15) are disposed in the overrunning position as the shaft 172 is being driven in the second rotational direction (R2) via the water pump pulley 164 while the FEAD driver pulley 170 is being driven in the first rotational direction (R1)). Accordingly, power is not transmitted from the FEAD driver pulley 170 to the water pump 160 or the water pump pulley 164.

Second Example

BAS Operation

The engine 18 can be in a condition in which the crankshaft 24 is not rotating, as when the engine 18 has been shut down in accordance with an idle-stop control methodology and is required to be re-started. The control assembly 52 can be operated to cause the motor/generator 150 to operate in the second mode such that electrical power from the battery 200 is employed to drive the starter/generator pulley 156a in the first rotational direction (R1) to drive the BAS/ISAF belt 50 in the direction of arrow 222 to cause the FEAD driver pulley 170 and the starter pulley 106 to rotate in the first rotational direction (R1). Rotation of the FEAD driver pulley 170 in the first rotational direction (R1) causes the fourth clutch 168 to operate in a disengaged condition. Accordingly, power is not transmitted via the BAS/ISAF belt 50 from the FEAD driver pulley 170 to the water pump 160 or the water pump pulley 164. Rotation of the starter pulley 106 in the first rotational direction (R1) causes the third clutch 110 to operated in the engaged condition to transmit rotary power from the starter pulley 106 to the inner hub 100 and crankshaft 24 so that they rotate in the first rotational direction (R1). As the second clutch 108 is a centrifugal clutch in the example provided, it will be appreciated that when the rotational speed of the inner hub 100 reaches the predetermined rotational speed, the second clutch 108 can operate in the engaged condition to transmit power between the starter pulley 106 and the inner hub 100. As the inner hub 100 rotates in the first rotational direction (R1), the first clutch 104 will operate in the engaged condition so that rotary power is transmitted from the inner hub 100 to the crankshaft pulley 102 to cause the crankshaft pulley 102 to rotate in the first rotational direction (R1) and drive the FEAD belt 46 in the direction of arrow 220. The water pump pulley 164 (rotates in the second rotational direction (R2)), as well as the power steering pump pulley 192 and the air conditioning compressor pulley 192 are driven by the FEAD belt 46 to power the water pump 160, the power steering pump 190 and the air conditioning compressor 190.

Second Example

ISAF Operation

Figure 22:
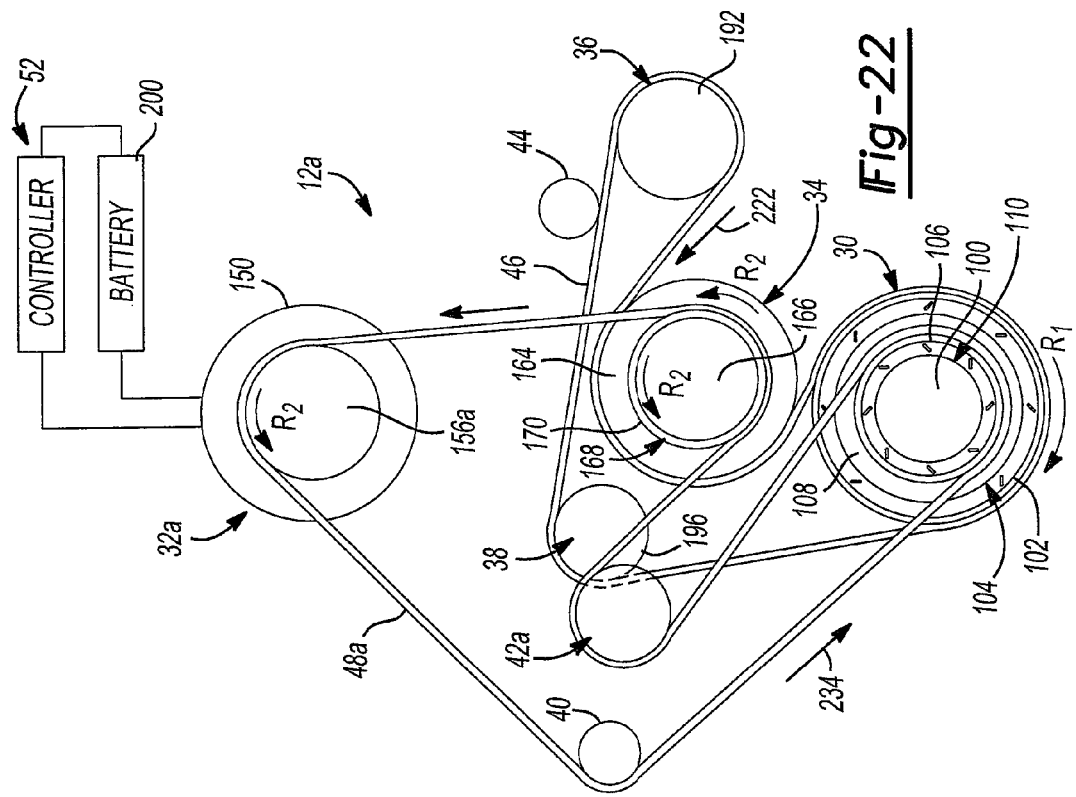
FIG. 22 is a schematic illustration of the PTS of FIG. 20 but illustrating the PTS as operating in the third mode.

With reference to FIGS. 21 and 22, the engine 18 can be in a condition in which the crankshaft 24 is not rotating, as when the engine 18 has been shut down in accordance with an idle-stop control methodology, but it is desired that the vehicle accessories (i.e., the water pump 160, the power steering pump 190 and the air conditioning compressor 190) remain in operation. The control assembly 52 can be operated to cause the motor/generator 150 to operate in the third mode such that electrical power from the battery 200 is employed to drive the starter/generator pulley 156a in the second rotational direction (R2). Rotation of the starter/generator pulley 156a in the second rotational direction (R2) can drive the BAS/ISAF belt 50 in the direction of arrow 234 to cause the FEAD driver pulley 170 and the starter pulley 106 to rotate in the second rotational direction (R2). Rotation of the FEAD driver pulley 170 in the second rotational direction (R2) can cause the fourth clutch 168 to operate in an engaged condition (rotation of the FEAD driver pulley 170 in the second rotational direction (R2) causes the sprags 184 (FIG. 15) to be positioned in the engaged position in the example provided) to transmit rotary power to the shaft 172 so that the shaft 172 and the water pump pulley 164 rotate in the second rotational direction (R2). The water pump pulley 164 can drive the FEAD belt 46 in the direction of arrow 220 to rotate the power steering pump pulley 192, the air conditioning compressor pulley 192 and the crankshaft pulley 102. Rotation of the crankshaft pulley 102 in the first rotational direction (R1) can cause the first clutch 104 to operate in a disengaged mode (the crankshaft pulley 102 is rotating in the first rotational direction (R1) at a speed that is higher than the rotational speed of the inner hub 100 in the example provided) and consequently, rotary power is not transmitted through the first clutch 104 to the inner hub 100. Rotation of the starter pulley 106 in the second rotational direction (R2) can cause the third clutch 110 to operate in a disengaged mode so that rotary power is not transmitted from the starter pulley 106 to the inner hub 100.

Third Example

With reference to FIGS. 23 through 26, another PTS constructed in accordance with the teachings of the present disclosure is generally indicated by reference numeral 12b. The crankshaft 24 of the engine 18 can be coupled to the PTS 12b to power various vehicle accessories. In the particular example provided, the PTS 12b can include a crankshaft pulley assembly 30b, a motor/generator assembly 32b, a water pump assembly 34b, a power steering pump assembly 36, an air conditioning compressor assembly 38, an idler assembly 40b, a tensioner assembly 44b, a FEAD belt 46, an ISAF belt 50b and a control assembly 52. As the power steering pump assembly 36, the air conditioning compressor assembly 38, the FEAD belt 46 and the control assembly 52 are described in detail above, further discussion of these components will not be provided. Moreover, while the idler assembly 40b and the tensioner assembly 44b may be configured or located somewhat differently than the idler assembly 40 and the second tensioner assembly 44 described above and illustrated in FIG. 2, it will be appreciated that they are employed to tension and route the FEAD belt 46 in a conventional and well know manner and as such, a detailed discussion of these components need not be provided herein.

Figure 24:
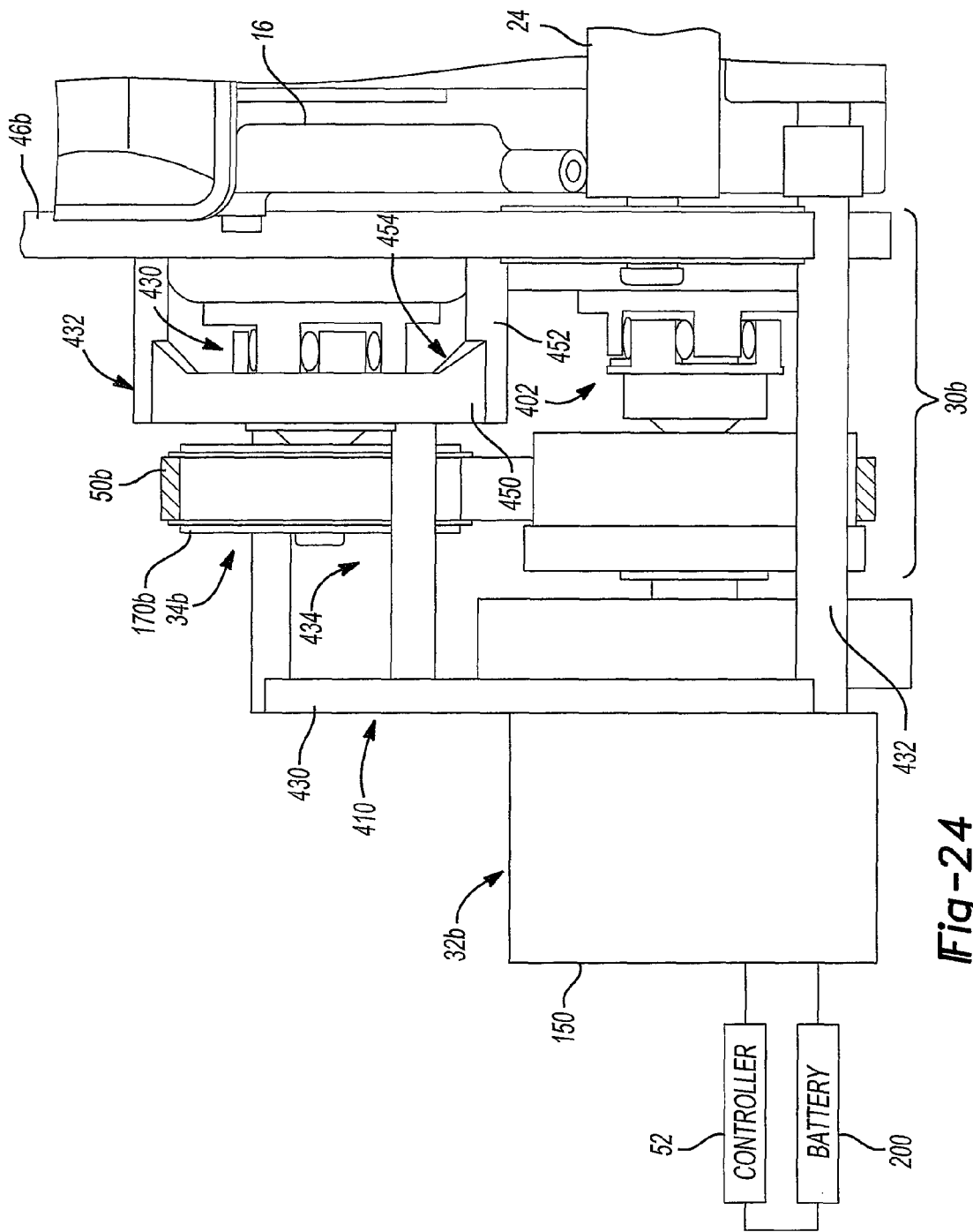
FIG. 24 is a side elevation view of the PTS and engine of FIG. 23.
Figure 26:
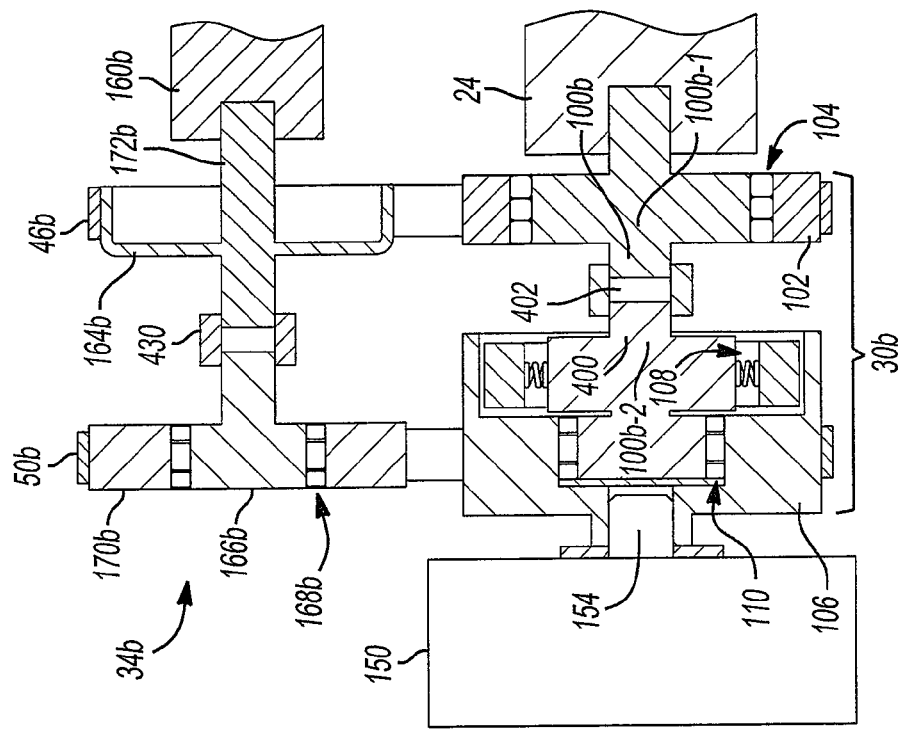
FIG. 26 is a schematic cross-sectional illustration of a portion of the PTS of FIG. 23.
Figure 25:
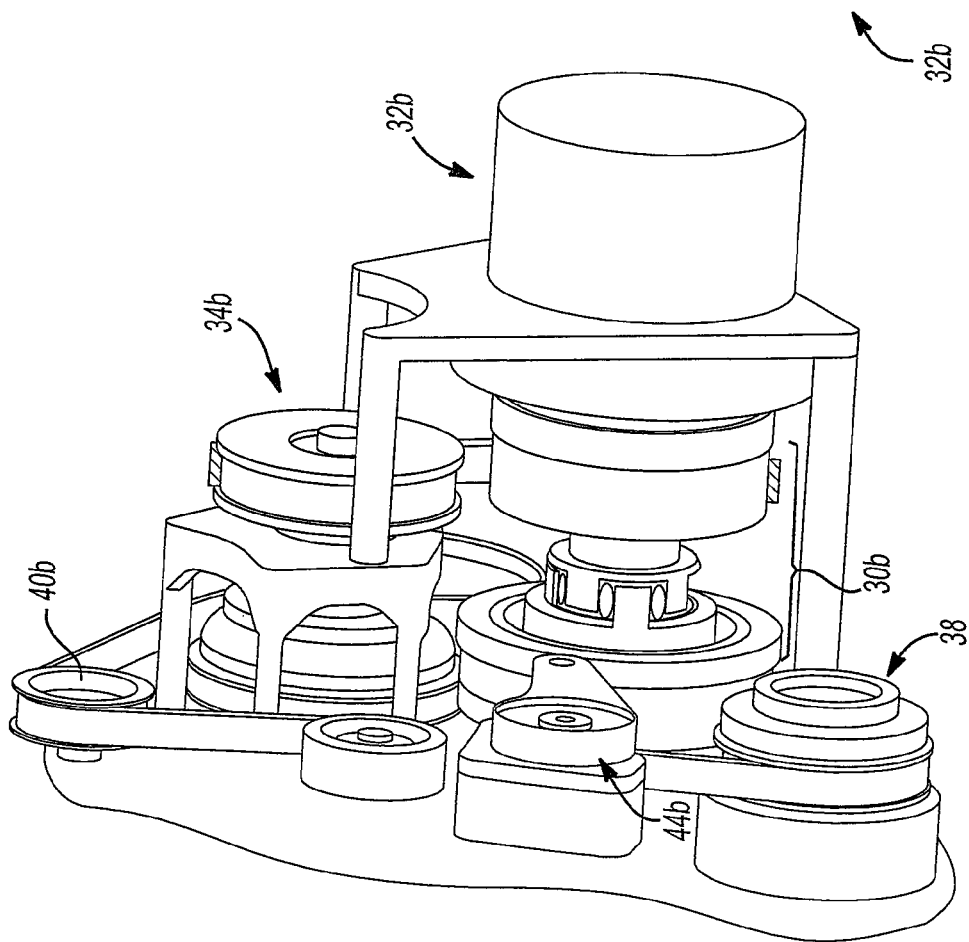
FIG. 25 is a perspective view of the PTS and engine of FIG. 23 taken from the left side of the engine.
Figure 27:
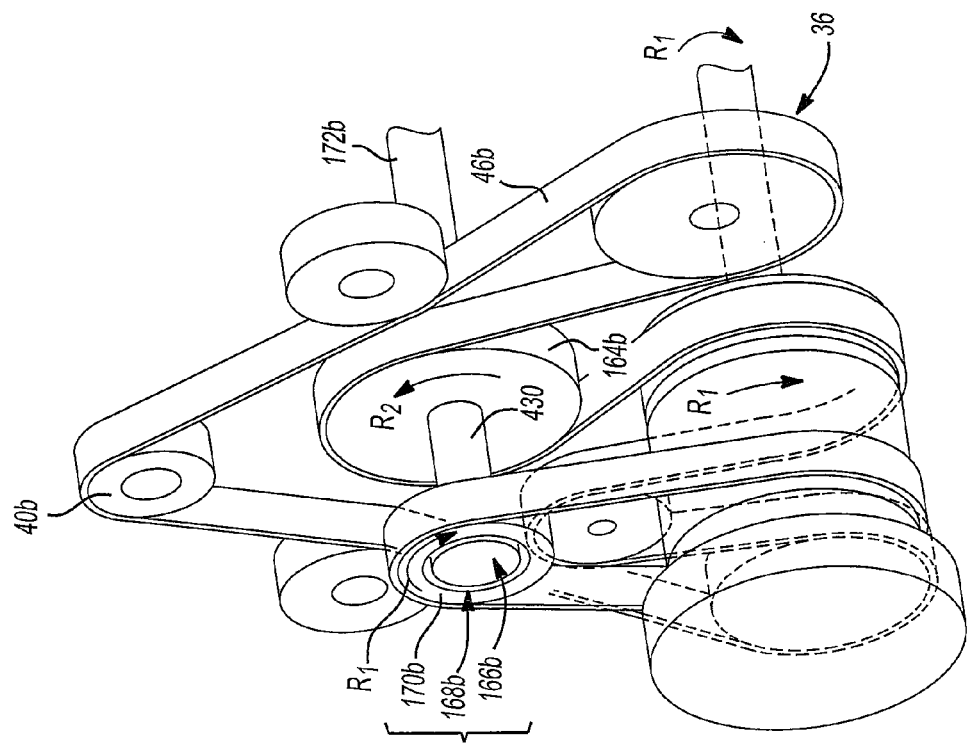
FIG. 27 is a perspective view of a portion of a portion of the PTS of FIG. 23.

With reference to FIGS. 24, 26 and 27, crankshaft pulley assembly 30b can be generally similar to the crankshaft pulley assembly 30 of FIG. 2, except the inner hub 100b is segregated into a first portion 100b-1, which can be coupled to the crankshaft 24 and associated with the crankshaft pulley 102 in a manner that is similar to that which is described above and illustrated in FIG. 4, and a discrete and separate second portion 100b-2 that is associated with the starter pulley 106. The first portion 100b-1 of the inner hub 100b can be coupled to a first end 400 of the second portion 100b-2 the inner hub 100b (to thereby couple the second portion 100b-2 of the inner hub 100b to the crankshaft 24 of the engine 18) via a misalignment coupling 400. The misalignment coupling 400 can be any type of coupling, such as a coupling that reduces or eliminates the transmission a bending force that would be applied to the crankshaft 24. It will be appreciated that the inner hub 100b could be unitarily formed and that the misalignment coupling could be positioned between a first end of the inner hub 100b and the crankshaft 24 in the alternative or between a second, opposite end of the inner hub 100-b and the motor/generator assembly 32b.

The motor/generator assembly 32b can include a motor/generator 150, a motor mount bracket 410. The shaft 154 of the motor/generator 150 can be coupled to the inner hub 100 in a convenient manner such that the rotational axis of the shaft 154 of the motor/generator 150 is coincident with a rotational axis of the starter pulley 106. The motor/generator 150 is operable in a first mode for generating electric power from rotary motion that is input to the motor/generator 150, a second mode for converting electric power into rotary motion that causes the shaft 154 to rotate in the first rotational direction (R1), and a third mode for converting electric power into rotary motion that causes the shaft 154 to rotate in the second rotational direction (R2). As used throughout this application (except as otherwise explicitly stated), the rotational direction of any component, including the shaft 154 of the motor/generator 150 in the PTS 12b, will be as interpreted from a viewer standing in front of a vehicle that incorporates the engine 18 and the PTS (12, 12a or 12b) (i.e., a viewer positioned in front of the vehicle 10 and looking in the direction of arrow 420 in FIG. 1). The motor/generator 150 can be mounted to the motor mount bracket 410 and the motor mount bracket 410 can be fixedly, but removably coupled to the engine 18 to support the motor/generator 150 and the crankshaft pulley assembly 30b. In the particular example provided, the motor mount bracket 410 includes a plate member 430, which is fixedly but removably coupled to the motor/generator 150, and a plurality of legs 432 that extend between the engine 18 and the plate member 430 to provide a relatively open space 434 through which the FEAD belt 46 and the ISAF belt 50b may be routed as necessary.

The water pump assembly 34b can include a water pump 160b, a water pump pulley 164b, a FEAD driver pulley 170b, a FEAD driver pulley hub 166, a fourth clutch 168b, a misalignment coupling 430 and a FEAD driver pulley mount 432. The water pump 160b can be a conventional water pump that can be employed to circulate engine coolant through the engine 18. The water pump pulley 164 can be coupled to a shaft 172b of the water pump 160b. The FEAD driver pulley hub 166 can be non-rotatably coupled to the shaft 172b of the water pump 160b via the misalignment coupling 430. The fourth clutch 168b can be disposed between the FEAD driver pulley hub 166b and the FEAD driver pulley 170b and can be configured to selectively couple the FEAD driver pulley 170b and the FEAD driver pulley hub 166b to permit rotary power to be transmitted therebetween. The fourth clutch 168b can be installed to the FEAD driver pulley hub 166b and the FEAD driver pulley 170b such that rotary power is not transmitted from the FEAD driver pulley 170b to the shaft 172b when the FEAD driver pulley 170b rotates in the first rotational direction (R1) but is transmitted from the FEAD driver pulley 170b to the shaft 172b when the FEAD driver pulley 170b is rotated in the second rotational direction (R2).

The FEAD driver pulley 170b, the FEAD driver pulley hub 166b, the fourth clutch 168b and the misalignment coupling 430 can be mounted to FEAD driver pulley mount 432 and the FEAD driver pulley mount 432 can be fixedly, but removably coupled to the engine 18 to support the FEAD driver pulley 170b, etc. In the particular example provided, the FEAD driver pulley mount 432 includes a plate member 450, which journally supports a portion (not specifically shown) of the misalignment coupling 430, and a plurality of legs 452 that extend between the engine 18 and the plate member 450 to provide a relatively open space 452 through which the FEAD belt 46 may be routed as necessary.

The FEAD belt 46 can be engaged to the crankshaft pulley 102, the water pump pulley 164b, the power steering pump pulley 192, the air conditioning compressor pulley 192, the idler assembly 40 and the tensioner assembly 44b, while the ISAF belt 50, which can be a cogged belt in the example provided, can be disposed about the starter pulley 106 and the FEAD driver pulley 170b. Accordingly, it will be appreciated that the FEAD belt 46 can be employed to transmit power between the water pump pulley 164, the power steering pump pulley 192, the air conditioning compressor pulley 192 and the crankshaft pulley 102, while the ISAF belt 50 can be employed to transmit power between the starter pulley 106b and the FEAD driver pulley 170.

Third Example

Engine Powered Operation

With reference to FIGS. 26 and 27, the engine 18 can be operated such that the crankshaft 24 will rotate in the first rotational direction (R1) at a speed above the predetermined rotational speed. As the inner hub 100b is coupled for rotation with the crankshaft 24, the first clutch 104 will operate in an engaged condition (rotary power is being transmitted from the inner hub 100b to the crankshaft pulley 102 in a first rotational direction (R1) and in the example provided, the sprags 124 (FIG. 8) are disposed in the engaged position), the second clutch 108 will operate in an engaged condition (in the example provided, the clutch members 134 (FIG. 10) have moved outwardly in response to centrifugal force and frictionally engaged the outer clutch member 132), the third clutch 110 can operate in a disengaged condition (rotary power is being applied to the inner hub 100b and in the example provided, the sprags 144 are disposed in the overrunning position).

Power is transmitted from the crankshaft 24, through the inner hub 100b, the first clutch 104 and the crankshaft pulley 102 (rotates in the first rotational direction (R1)), and to the water pump pulley 164b (rotates in the second rotational direction (R2)), as well as the power steering pump pulley 192 and the air conditioning compressor pulley 192, via the FEAD belt 46 to power the water pump 160, the air conditioning compressor 190 and the power steering pump 190. Power is also transmitted from the crankshaft 24, through the inner hub 100b, the second clutch 108 and the starter pulley 106 (rotates in the first rotational direction (R1)) to cause the shaft 154b of the motor/generator 150 to rotate in the first rotational direction (R1) so that the motor/generator 150 can operate in the first mode. The FEAD driver pulley 170b, which is rotated in the first rotational direction (R1) as a result of engagement between the ISAF belt 50, the starter pulley 106 and the FEAD driver pulley 170b. The fourth clutch 168b operates in a disengaged condition (in the example provided, the sprags 184 (FIG. 15) are disposed in the overrunning position as the shaft 172b is being driven in the second rotational direction (R2) via the water pump pulley 164b while the FEAD driver pulley 170b is being driven in the first rotational direction (R1). Accordingly, power is not transmitted from the FEAD driver pulley 170b to the water pump 160b or the water pump pulley 164b.

Third Example

BAS Operation

The engine 18 can be in a condition in which the crankshaft 24 is not rotating, as when the engine 18 has been shut down in accordance with an idle-stop control methodology and is required to be re-started. The control assembly 52 can be operated to cause the motor/generator 150 to operate in the second mode such that electrical power from the battery 200 is employed to drive the shaft 154b in the first rotational direction (R1) to drive the starter pulley 106 in the first rotational direction (R1). Rotation of the starter pulley 106 in the first rotational direction (R1) causes the third clutch 110 to operate in the engaged condition to transmit rotary power from the starter pulley 106 to the inner hub 100b and crankshaft 24 so that they rotate in the first rotational direction (R1). As the second clutch 108 is a centrifugal clutch in the example provided, it will be appreciated that when the rotational speed of the inner hub 100b reaches the predetermined rotational speed, the second clutch 108 can operate in the engaged condition to transmit power between the starter pulley 106 and the inner hub 100b. As the inner hub 100b rotates in the first rotational direction (R1), the first clutch 104 will operate in the engaged condition so that rotary power is transmitted from the inner hub 100b to the crankshaft pulley 102 to cause the crankshaft pulley 102 to rotate in the first rotational direction (R1) and drive the FEAD belt 46. The water pump pulley 164 (rotates in the second rotational direction (R2)), as well as the power steering pump pulley 192 and the air conditioning compressor pulley 192 are driven by the FEAD belt 46 to power the water pump 160, the power steering pump 190 and the air conditioning compressor 190. Rotation of the starter pulley 106 in the first rotational direction (R1) also transmits rotary power to the FEAD driver pulley 170b via the ISAF belt 50 to cause the FEAD driver pulley 170b to rotate in the first rotational direction (R1). Rotation of the FEAD driver pulley 170 in the first rotational direction (R1) causes the fourth clutch 168b to operate in a disengaged condition. Accordingly, power is not transmitted via the ISAF belt 50 from the FEAD driver pulley 170 to the shaft 154b of the water pump 160.

Third Example

ISAF Operation

Figure 28:
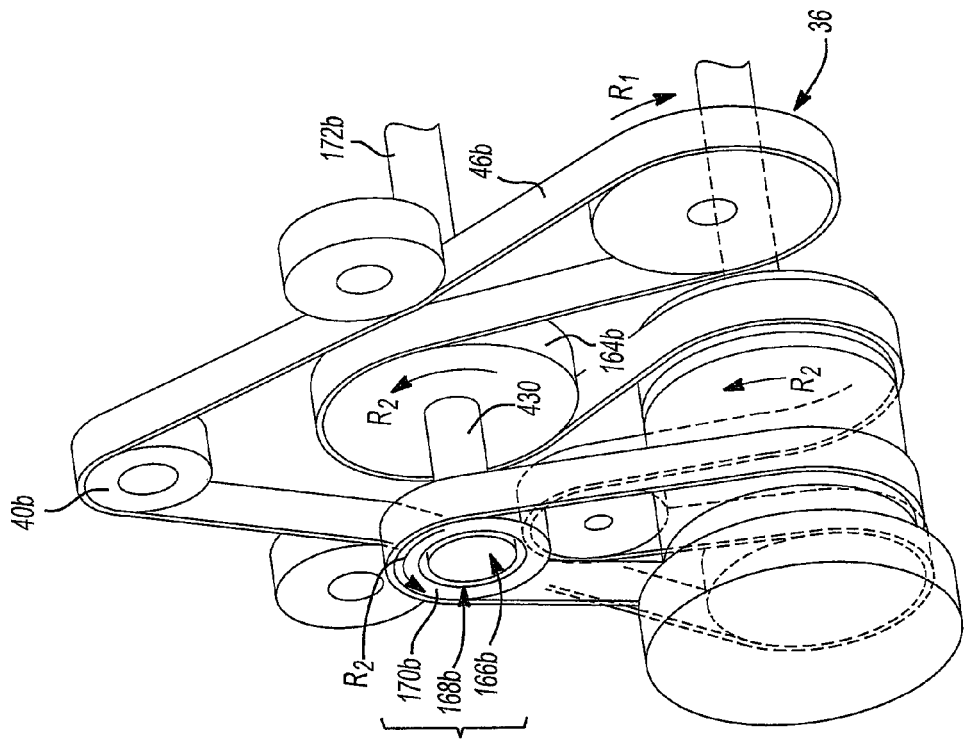
FIG. 28 is a perspective view of a portion of a portion of the PTS of FIG. 23 illustrating the PTS operating in the third mode.

With reference to FIGS. 26 and 28, the engine 18 can be in a condition in which the crankshaft 24 is not rotating, as when the engine 18 has been shut down in accordance with an idle-stop control methodology, but it is desired that the vehicle accessories (i.e., the water pump 160b, the power steering pump 190 and the air conditioning compressor 190) remain in operation. The control assembly 52 can be operated to cause the motor/generator 150 to operate in the third mode such that electrical power from the battery 200 is employed to drive the starter pulley 106 in the second rotational direction (R2). Rotation of the starter pulley 106 in the second rotational direction (R2) can drive the ISAF belt 50 to cause the FEAD driver pulley 170b to rotate in the second rotational direction (R2). Rotation of the FEAD driver pulley 170b in the second rotational direction (R2) can cause the fourth clutch 168b to operate in an engaged condition (rotation of the FEAD driver pulley 170b in the second rotational direction (R2) causes the sprags 184 (FIG. 15) to be positioned in the engaged position in the example provided) to transmit rotary power to the hub 166b so that the shaft 172b and the water pump pulley 164b rotate in the second rotational direction (R2). The water pump pulley 164b can drive the FEAD belt 46b to rotate the power steering pump pulley 192, the air conditioning compressor pulley 192 and the crankshaft pulley 102. Rotation of the crankshaft pulley 102 in the first rotational direction (R1) can cause the first clutch 104 to operate in a disengaged mode (the crankshaft pulley 102 is rotating in the first rotational direction (R1) at a speed that is higher than the rotational speed of the inner hub 100b in the example provided) and consequently, rotary power is not transmitted through the first clutch 104 to the inner hub 100b. Rotation of the starter pulley 106 in the second rotational direction (R2) can cause the third clutch 110 to operate in a disengaged mode so that rotary power is not transmitted from the starter pulley 106 to the inner hub 100b.

While the PTS 12, 12a and 12b of FIGS. 2, 20 and 23 have been illustrated and described in an automotive context and with various belts and a motor generator that is configured to produce or use DC electric power, it will be appreciated that the teachings of the present disclosure have broader application. Accordingly, it will be appreciated that a PTS constructed in accordance with the teachings of the present disclosure could be employed in any type of engine-powered application, that such PTS could be configured to distribute power using any type or combination of endless power transmitting element and/or that such PTS could employ a motor/generator that was configured to produce or use AC electric power. Accordingly, it is within the scope of the present disclosure to configure a PTS constructed in accordance with the teachings of the present disclosure with chains or a combination of one or more belts and one or more chains.

It will be understood that as used herein and in the appended claims, the term "drive member" is employed to refer to a device, such as a pulley or sprocket, that can engage a flexible, endless power transmitting member (EPTM), such as a chain or a belt, to transmit power or to route the EPTM in a desired direction. It will also be understood that as used herein and in the appended claims, the term "accessory drive system" is employed to refer to a system having one or more components (i.e., accessories) that are driven by an EPTM. In the particular examples provided, an accessory drive system is shown in FIG. 2 and includes the water pump assembly 34, power steering pump assembly 36 and air conditioning compressor assembly 38. It will be further appreciated that as used herein, the words "first", "second", "third" and "fourth" to describe various elements (e.g., clutches) are employed in the description and appended claims for the sake of convenience and that their usage in the appended claims may not correspond to their usage in the description.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A device comprising:
an engine having an output member;
a first drive assembly having an input member, a first drive member, a second drive member, a first clutch, a second clutch and a third clutch, the input member being coupled to an output of the engine, the first clutch being configured to couple the input member to the first drive member when the output member of the engine is driving the input member, the second and third clutches coupling the second drive member to the input member, the second clutch being operable in an engaged mode to transmit rotary power from the input member to the second drive member and a disengaged mode in which the second clutch does not transmit rotary power between the input member and the second drive member, the third clutch being operable in an engaged mode to transmit rotary power in a first rotational direction from the second drive member to the input member and a disengaged condition in which rotary power is not transmitted through the third clutch between the input member and the second drive member;
a motor/generator having a shaft, the motor/generator being operable in a first mode, in which rotary power is input to the motor/generator and the motor/generator outputs electric power, a second mode in which electric power is input to the motor/generator to cause the shaft of the motor/generator to rotate in the first rotational direction, and a third mode in which electric power is input to the motor/generator to cause the shaft of the motor/generator to rotate in a second rotational direction opposite the first rotational direction;
an accessory drive system having an accessory endless power transmitting member and an accessory assembly with an accessory, a third drive member, a fourth drive member and a fourth clutch, the accessory endless power transmitting member being coupled to the first drive member and the third drive member to transmit rotary power therebetween, the third drive member being coupled for rotation with an input shaft of the accessory, the fourth clutch being configured to inhibit transmission of rotary power between the fourth drive member and the input shaft of the accessory when the fourth drive member is driven in the first rotational direction, the fourth clutch being configured permit transmission of rotary power between the fourth drive member and the input shaft of the accessory when the fourth drive member is driven in the second rotational direction; and
a coupling means for coupling the shaft of the motor/generator to the second drive member and for coupling the shaft of the motor/generator to the fourth drive member.

2. The device of claim 1, wherein the coupling means couples the shaft of the motor/generator directly to second drive member such that a rotational axis of the motor/generator is coincident with a rotational axis of the second drive member.

3. The device of claim 1, wherein the coupling means includes a first endless power transmitting member for transmitting rotary power between the motor/generator and the second drive member.

4. The device of claim 3, wherein the first endless power transmitting member also transmits rotary power to the fourth drive member.

5. The device of claim 3, wherein the coupling means includes a fifth drive member, which is coupled for rotation with the shaft of the motor/generator, and a second endless power transmitting member that transmits rotary power between the fifth drive member and the fourth drive member.

6. The device of claim 1, wherein at least one of the first, third and fourth clutches is selected from a group of clutches that consists of sprag clutches, freewheeling clutches, cam clutches, roller clutches, roller ramp clutches, tapered roller clutches and spring clutches.

7. The device of claim 6, wherein each of the first, third and fourth clutches is selected from the group of clutches.

8. The device of claim 1, wherein each of the first, third and fourth clutches is an overrunning clutch.

9. The device of claim 1, wherein second clutch is a locking clutch.

10. The device of claim 9, wherein the locking clutch is a centrifugal clutch.

11. The device of claim 10, wherein the centrifugal clutch engages at a rotational speed that is less than a speed at which the engine idles.

12. The device of claim 11, wherein the rotational speed is about 300 rotations per minute to about 500 rotations per minute.

13. A method comprising:
providing a device with engine, an accessory drive system and a motor/generator, the engine having an output member, the accessory drive system including an accessory that is driven by rotary power;
operating the device in a first mode in which the engine generates rotary power that is output from the output member in a first rotational direction, the rotary power driving the accessory of the accessory drive system and rotating the motor/generator such that the motor/generator produces electrical energy;
operating the device in a second mode in which the motor/generator generates rotary power that is output in the first rotational direction to drive the output member of the engine, wherein a portion of the rotary power is transmitted through a first clutch and a second clutch to drive the accessory of the accessory drive system; and
operating the device in a third mode in which the motor/generator generates rotary power that is output in a second rotational direction opposite the first rotational direction, the rotary power being transmitted through a third clutch to drive the accessory of the accessory drive system;
wherein in the third mode, the second clutch prevents the rotary power from being transmitted to the output member of the engine.

14. The method of claim 13, wherein the first, second and third clutches engage only in response to one or more criteria selected from a group consisting of (a) outputting of rotary power from the output member of the engine in the first rotational direction, (b) rotation of the output member of the engine at a rotational speed above a predetermined rotational speed, (c) outputting of rotary power from the motor/generator in the first rotational direction, and (d) outputting of rotary power from the motor/generator in the second rotational direction.

15. The method of claim 14, wherein each of the first, second and third clutches is an overrunning clutch or a spring clutch.

16. The method of claim 13, wherein rotary power is transmitted through a fourth clutch when the device is operated in the first mode.

17. The method of claim 16, wherein the fourth clutch is a centrifugal clutch.

18. The method of claim 17, wherein the centrifugal clutch engages at a predetermined rotational speed that is less than a rotational speed at which the engine idles.

19. The method of claim 18, wherein the predetermined rotational speed is about 300 rotations per minute to about 500 rotations per minute.

20. A device comprising:
an engine having an output member;
a first drive assembly having an input member, a first drive member, a second drive member, a first clutch, a second clutch and a third clutch, the input member being coupled to an output of the engine, the first clutch being configured to couple the input member to the first drive member when the output member of the engine is driving the input member, the second and third clutches coupling the second drive member to the input member, the second clutch being operable in an engaged mode to transmit rotary power from the input member to the second drive member and a disengaged mode in which the second clutch does not transmit rotary power between the input member and the second drive member, the third clutch being operable in an engaged mode to transmit rotary power in a first rotational direction from the second drive member to the input member and a disengaged condition in which rotary power is not transmitted through the third clutch between the input member and the second drive member;

a motor/generator having a shaft, the motor/generator being operable in a first mode, in which rotary power is input to the motor/generator and the motor/generator outputs electric power, a second mode in which electric power is input to the motor/generator to cause the shaft of the motor/generator to rotate in the first rotational direction, and a third mode in which electric power is input to the motor/generator to cause the shaft of the motor/generator to rotate in a second rotational direction opposite the first rotational direction;

an accessory drive system having an accessory endless power transmitting member and an accessory assembly with an accessory, a third drive member, a fourth drive member and a fourth clutch, the accessory endless power transmitting member being coupled to the first drive member and the third drive member to transmit rotary power therebetween, the third drive member being coupled for rotation with an input shaft of the accessory, the fourth clutch being configured to inhibit transmission of rotary power between the fourth drive member and the input shaft of the accessory when the fourth drive member is driven in the first rotational direction, the fourth clutch being configured permit transmission of rotary power between the fourth drive member and the input shaft of the accessory when the fourth drive member is driven in the second rotational direction; and a coupling means for coupling the shaft of the motor/generator to the second drive member and for coupling the shaft of the motor/generator to the fourth drive member;

wherein the coupling means includes a first endless power transmitting member for transmitting rotary power between the motor/generator and the second drive member and wherein the first endless power transmitting member also transmits rotary power to the fourth drive member. wherein each of the first, third and fourth clutches is an overrunning clutch or a spring clutch; and wherein the second clutch is a centrifugal clutch that engages at a rotational speed that is less than a speed at which the engine idles.

\* \* \* \* \*